United States Patent [19]

Kitatani et al.

[11] Patent Number: 4,985,324
[45] Date of Patent: Jan. 15, 1991

[54] ELECTROPHOTOGRAPHIC PHOTORECEPTOR

[75] Inventors: Katsuji Kitatani; Naonori Makino; Satoshi Hoshi; Hideo Sato; Shigeru Ohno, all of Kanagawa, Japan

[73] Assignee: Fuji Photo Film Co., Ltd., Kanagawa, Japan

[21] Appl. No.: 421,901

[22] Filed: Oct. 16, 1989

[30] Foreign Application Priority Data

Oct. 18, 1988 [JP] Japan .................. 63-262200

[51] Int. Cl.$^5$ .......................... G03G 5/06; G03G 5/14
[52] U.S. Cl. .......................... 430/56; 430/58; 430/72; 430/78
[58] Field of Search .................. 430/57, 58, 73, 78

[56] References Cited

U.S. PATENT DOCUMENTS 4,882,249 11/1989 Kitatani et al. ............. 430/58 X

Primary Examiner—David Welsh
Attorney, Agent, or Firm—Sughrue, Mion, Zinn, Macpeak & Seas

[57] ABSTRACT

An electrophotographic photoreceptor comprising an electroconductive support having thereon a layer containing a charge carrier-transporting compound and a charge carrier-generating compound or having thereon a layer containing a charge carrier-transporting compound and a layer containing a charge carrier-generating compound, wherein the photoreceptor contains a tetrakisazo compound of the following formula (I) as the charge carrier-generating compound:

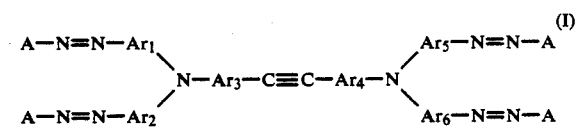

wherein $Ar_1$, $Ar_2$, $Ar_3$, $Ar_4$, $Ar_5$ and $Ar_6$, which may be the same or different, each represents an arylene group, a divalent condensed polycyclic aromatic group or a divalent heterocyclic aromatic group;
A represents

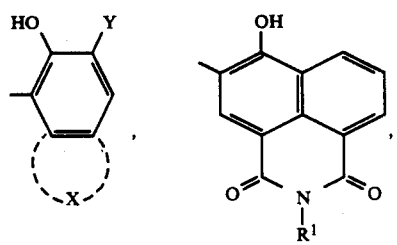

-continued

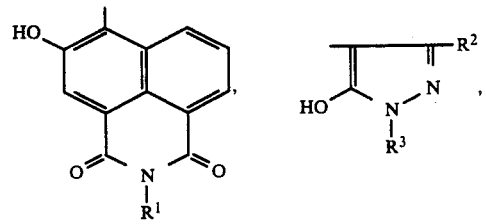

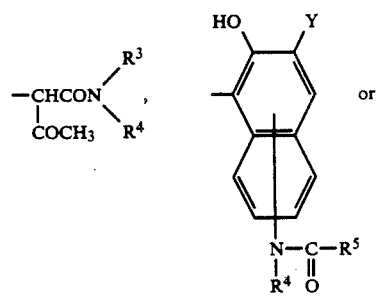

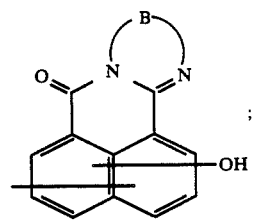

X represents an atomic group necessary to form an aromatic ring or heterocyclic ring condensed with the benzene ring of the formula having the hydroxyl group and Y bonded thereto;
Y represents

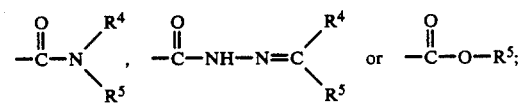

$R^1$ represents an alkyl group or a phenyl group;
$R^2$ represents a hydrogen atom, a lower alkyl group, a carbamoyl group, a carboxyl group, an alkoxycarbonyl group, an aryloxycarbonyl group or an amino group;
$R^3$ represents an alkyl group, an aromatic group or a heterocyclic aromatic group;
$R^4$ and $R^5$, which may be the same or different, each represents a hydrogen atom, an alkyl group, an aromatic group or a heterocyclic aromatic group, provided that both $R^4$ and $R^5$ are not simultaneously hydrogen atoms; when Y represents

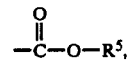

$R^5$ is not a hydrogen atom; and
B represents a divalent aromatic hydrocarbon residue or a divalent heterocyclic group containing a nitrogen atom(s) in the ring.

12 Claims, No Drawings

ELECTROPHOTOGRAPHIC PHOTORECEPTOR

FIELD OF THE INVENTION

The present invention relates to an electrophotographic photoreceptor which contains an electrophotographic light-sensitive layer containing a tetrakisazo compound.

BACKGROUND OF THE INVENTION

Inorganic materials such as selenium, cadmium sulfide, zinc oxide and amorphous silicon are well known as photoconductive compositions for use in electrophotographic photoreceptors.

These inorganic photoreceptors advantageously have good electrophotographic characteristics of extremely high photoconductivity as well as excellent charge acceptability and electric insulating property in the dark. On the contrary, however, these photoreceptors have various drawbacks. For instance, a selenium photoreceptor has drawbacks that the manufacturing cost is high, moreover, the selenium photoreceptor itself is not flexible and is not resistant to heat and mechanical shock. A cadmium sulfide photoreceptor causes environmental pollution since it contains cadmium which is harmful. A zinc oxide photoreceptor has poor image stability when used repeatedly for a long period of time. An amorphous silicon photoreceptor also has the drawbacks that the manufacture cost is extremely high and a particular surface treatment for the purpose of preventing deterioration of the surface of the photoreceptor itself is necessary.

Recently, electrophotographic photoreceptors using various organic materials have been proposed so as to overcome the drawbacks of the inorganic materials, and some have been put to practical use. For example, an electrophotographic photoreceptor comprising poly-N-vinylcarbazole and 2,4,7-trinitrofluoren-9-one (U.S. Pat. No. 3,484,237); an electrophotographic photoreceptor comprising poly-N-vinylcarbazole sensitized with a pyrylium salt dye (JP-B-No. 48-25658) (the term "JP-B" as used herein means an "examined Japanese patent publication"); and an electrophotographic photoreceptor with as a main component, an eutectic complex comprising a dye and a resin (JP-A-No. 47-10735) (the term "JP-A" as used herein means an "unexamined published Japanese patent application") are known.

In addition, electrophotographic photoreceptors with, as a main component, an organic dye such as perylene pigments (U.S. Pat. No. 3,371,884), phthalocyanine pigments (U.S. Pat. Nos. 3,397,086 and 4,666,802), azulenium salt pigments (JP-A-No. 59-53850 and JP-A-No. 61-212542), squalium salt pigments (U.S. Pat. No. 4,396,610 and 4,644,082) and polycyclic quinone pigments (JP-A-No. 59-184348 and JP-A-No. 62-28738), or an azo pigments, as described below, have widely been studied recently and various proposals have been made.

Bisazo Pigments

Described in JP-A-No. 47-37543, JP-B-60-5941, JP-B-60-45664, JP-A-No. 56-116039, JP-A-No. 58-123541, JP-A-No. 61-260250, JP-A-No. 61-228453, JP-A-No. 61-275849, JP-A-No. 61-260250.

Trisazo Pigments

Described in U.S. Pat. Nos. 4,436,800, 4,439,506, JP-A-No. 53-132347, JP-A-No. 55-69148, JP-A-No. 57-195767, JP-A-No. 57-200045, JP-A-No. 57-204556, JP-A-No. 58-31340, JP-A-No. 58-31341, JP-A-No. 58-154560, JP-A-No. 58-160358, JP-A-No. 58-160359, JP-A-No. 59-127044, JP-A-No. 59-196366, JP-A-No. 59-204046, JP-A-No. 59-204841, JP-A-No. 59-218454, JP-A-No. 60-111249, JP-A-No. 60-111250, JP-A-No. 61-11754, JP-A-No. 61-22346, JP-A-No. 61-35451, JP-A-No. 61-67865, JP-A-No. 61-121059, JP-A-No. 61-163969, JP-A-No. 61-179746, JP-A-No. 61-230157, JP-A-No. 61-251862, JP-A-No. 61-251865, JP-A-No. 61-269164, JP-A-No. 62-21157, JP-A-No. 62-78563, JP-A-No. 62-115452.

Tetrakisazo Pigments

Described in U.S. Pat. No. 4,447,513, JP-A-No. 60-108857, JP-A-No. 60-108858, JP-A-No. 60-111247, JP-A-No. 60-111248, JP-A-No. 60-118843, JP-A-No. 60-176046, JP-A-No. 61-103157, JP-A-No. 61-117559, JP-A-No. 61-182051, JP-A-No. 61-194447, JP-A-No. 61-196253, JP-A-No. 61-212848, JP-A-No. 61-240246, JP-A-No. 61-273548, JP-A-No. 61-284769, JP-A-No. 62-18565, JP-A-No. 62-18566, JP-A-No. 62-19875.

Organic electrophotographic photoreceptors are superior to the above-mentioned inorganic electrophotographic photoreceptors because the former have somewhat improved mechanical characteristics and flexibility. However, organic electrophotographic photoreceptors generally have poor light-sensitivity when used many times. Therefore these materials are unsuitable for repeated use. Thus the above-mentioned organic substances do not sufficiently satisfy the requirements for electrophotographic photoreceptors.

SUMMARY OF THE INVENTION

One object of the present invention is to provide a new electrophotographic photoreceptor with both high sensitivity and high durability.

Another object of the present invention is to provide a new electrophotographic photoreceptor whose light-sensitivity is hardly reduced even after repeated use.

The above objects are achieved by the present invention which provides an electrophotographic photoreceptor comprising an electroconductive support having thereon a layer containing both a charge carrier-transporting compound and a charge carrier-generating compound or having thereon both a layer containing a charge carrier-transporting compound and a layer containing a charge carrier-generating compound, wherein the photoreceptor contains a tetrakisazo compound of the following general formula (I) as the charge carrier-generating compound:

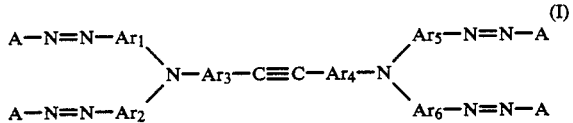

where $Ar_1$, $Ar_2$, $Ar_3$, $Ar_4$, $Ar_5$ and $Ar_6$, which may be the same or different, each represents an arylene group, a divalent condensed polycyclic aromatic group or a divalent heterocyclic aromatic group, which may optionally be substituted with substituent(s);

A represents

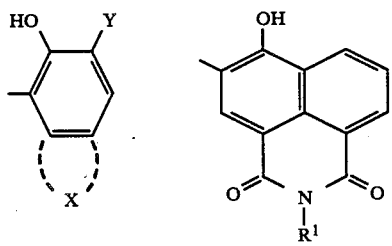

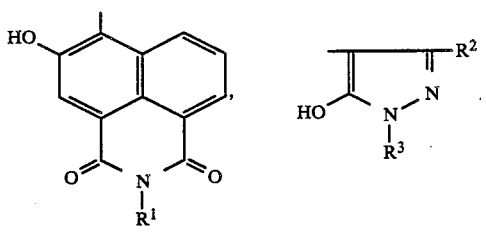

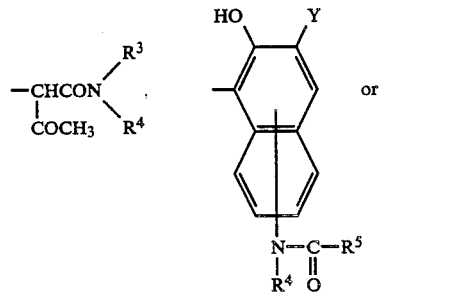

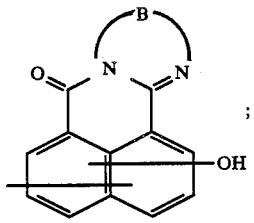

X represents an atomic group necessary for forming an aromatic ring or a heterocyclic ring condensed with the benzene ring of the formula with hydroxyl group and Y, and the ring may optionally be substituted with substituent(s);

Y represents

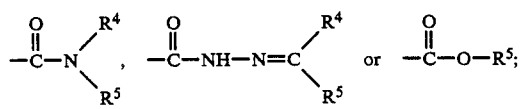

$R^1$ represents an alkyl group or a phenyl group, each of which may be substituted with substituent(s);

$R^2$ represents a hydrogen atom, a lower alkyl group, a carbamoyl group, a carboxyl group, an alkoxycarbonyl group, an aryloxycarbonyl group or an unsubstituted or substituted amino group;

$R^3$ represents an alkyl group, an aromatic group or a heterocyclic aromatic group, each of which may be substituted with substituent(s);

$R^4$ and $R^5$, which may be the same or different, each represents a hydrogen atom or an alkyl group, an aromatic group or a heterocyclic aromatic group, each of which may be substituted with substituent(s), provided that both $R^4$ and $R^5$ are not simultaneously hydrogen atoms; and when Y is —CO—O—$R^5$, $R^5$ must not be a hydrogen atom; and B represents a divalent aromatic hydrocarbon group or a divalent heterocyclic group containing nitrogen atom(s) in the ring, each of which may be substituted with substituent(s).

DETAILED DESCRIPTION OF THE INVENTION

The tetrakisazo compounds of the formula (I) are explained in greater detail hereunder.

X represents a group forming an aromatic ring, such as a naphthalene ring or an anthracene ring, or a hetero ring, such as an indole ring, a carbazole ring, a benzocarbazole ring or a dibenzofuran ring, which is condensed with the benzene ring having hydroxyl group and Y bonded thereto.

When X represents an aromatic or heterocyclic group which may have substituent(s), and suitable substituent(s) include a halogen ato (e.g., fluorine, chlorine, or bromine) and a lower alkyl group preferably having from 1 to 8 carbon atoms (e.g., methyl, ethyl, propyl, butyl, isopropyl, isobutyl). The number of substituents may be one or two. When the group have two substituents, they may be the same or different.

$R^1$ represents an alkyl group, preferably an alkyl group having from 1 to 12 carbon atoms, or a phenyl group.

When $R^1$ represents an unsubstituted alkyl group, examples thereof include methyl, ethyl, propyl, butyl, pentyl, hexyl, isopropyl, isobutyl, isoamyl, isohexyl, neopentyl, and tert-butyl groups.

When $R^1$ represents a substituted alkyl group, suitable substituents include, for example, a hydroxyl group, an alkoxy group having from 1 to 12 carbon atoms, a cyano group, an amino group, an alkylamino group having from 1 to 12 carbon atoms, a dialkylamino group having two alkyl groups each having from 1 to 12 carbon atoms, a halogen atom and an aryl group having from 6 to 15 carbon atoms. Examples of substituted alkyl groups include a hydroxyalkyl group (e.g., hydroxymethyl, 2-hydroxyethyl, 3-hydroxypropyl, 2-hydroxypropyl), an alkoxyalkyl group (e.g., methoxymethyl, 2-methoxyethyl, 3-methoxypropyl, ethoxymethyl, 2-ethoxyethyl), a cyanoalkyl group (e.g., cyanomethyl, 2-cyanoethyl), an aminoalkyl group (e.g., aminomethyl, 2-aminoethyl, 3-aminopropyl), an (alkylamino)alkyl group (e.g., (methylamino)methyl, 2-(methylamino)ethyl, (ethylamino)methyl), a (dialkylamino)alkyl group (e.g., (dimethylamino)methyl, 2-

(dimethylamino)ethyl), a haloalkyl group (e.g., fluoromethyl, chloromethyl, bromomethyl), and an aralkyl group (e.g., benzyl, phenethyl).

When $R^1$ represents a substituted phenyl group, suitable substituents include, for example, a hydroxyl group, an alkoxy group having from 1 to 12 carbon atoms, a cyano group, an amino group, an alkylamino group having from 1 to 12 carbon atoms, a dialkylamino group having two alkyl groups each having from 1 to 12 carbon atoms, a halogen atom, an alkyl group having from 1 to 6 carbon atoms, and a nitro group. Examples of substituted phenyl groups include a hydroxyphenyl group, an alkoxyphenyl group (e.g., methoxyphenyl, ethoxypohenyl), a cyanophenyl group, an aminophenyl group, an (alkylamino)phenyl group (e.g., (methylamino)phenyl, (ethylamino)phenyl), a (dialkylamino)phenyl group (e.g., (dimethylamino)phenyl), a halogenophenyl group (e.g., fluorophenyl, chlorophenyl, bromophenyl), an alkylphenyl group (e.g., tolyl, ethylphenyl, cumenyl, xylyl, mesityl), a nitrophenyl group, and phenyl groups with two or three (same or different) of these substituents. (The position of the substituents and the relation between the positions of plural substituents are not limited.)

$R^2$ is preferably a hydrogen atom, a lower alkyl group having from 1 to 6 carbon atoms, a carbamoyl group, a carboxyl group, an alkoxycarbonyl group with an alkoxy group having from 1 to 12 carbon atoms, an aryloxycarbonyl group with an aryloxy group having from 6 to 20 carbon atoms, or a substituted or unsubstituted amino group.

When $R^2$ represents a substituted amino group, examples thereof include methylamino, ethylamino, propylamino, phenylamino, tolylamino, benzylamino, phenethylamino, dimethylamino, diethylamino and diphenylamino groups.

When $R^2$ represents a lower alkyl group, examples thereof include methyl, ethyl, propyl, butyl, isopropyl and isobutyl groups.

When $R^2$ represents an alkoxycarbonyl group, examples thereof include methoxycarbonyl, ethoxycarbonyl, propoxycarbonyl, butoxycarbonyl, isopropoxycarbonyl and benzyloxycarbonyl groups.

When $R^2$ represents an aryloxycarbonyl group, examples thereof include phenoxycarbonyl and toluoxycarbonyl groups.

$R^3$ is preferably an alkyl group having from 1 to 20 carbon atoms, an aromatic group (having from 6 to 14 carbon atoms) such as a phenyl or naphthyl group, or a heterocyclic aromatic group (having from 13 to 16 carbon atoms) containing oxygen, nitrogen and/or sulfur atoms, such as dibenzofuranyl, carbazolyl or benzocarbazolyl group.

When $R^3$ represents a substituted or unsubstituted alkyl group, examples thereof may include those as described for the substituted or unsubstituted alkyl group mentioned for $R^1$.

When $R^3$ represents a substituted aromatic group such as a substituted phenyl or substituted naphthyl group, or represents a substituted heterocyclic aromatic group containing hetero atom(s) such as a substituted dibenzofuranyl group or a substituted carbazolyl group, examples of suitable substituents include a hydroxyl group, a cyano group, a nitro group, a halogen atom (e.g., fluorine, chlorine, or bromine), an alkyl group having from 1 to 12 carbon atoms (e.g., methyl, ethyl, propyl, isopropyl), an alkoxy group having from 1 to 12 carbon atoms (e.g., methoxy, ethoxy, propoxy, butoxy, pentyloxy, isopropoxy, isobutoxy, isoamyloxy, tertbutoxy, neopentyloxy), an amino group, an alkylamino group having from 1 to 12 carbon atoms (e.g., methylamino, ethylamino, propylamino), a dialkylamino group having from 1 to 12 carbon atoms (e.g., dimethylamino, diethylamino, N-methyl-N-ethylamino), an arylamino group having from 6 to 12 carbon atoms (e.g., phenylamino, tolylamino), a diarylamino group with two aryl groups each having from 6 to 15 carbon atoms (e.g., diphenylamino), a carboxyl group, an alkali metal carboxylato group (examples of alkali metal atoms (cation) include Na+, K+, Li+), an alkali metal sulfonato group (examples of alkali metal atoms (cation) include Na+, K+, Li+), an alkylcarbonyl group (e.g., acetyl, propionyl, benzylcarbonyl), an arylcarbonyl group with an aryl group having from 6 to 12 carbon atoms (e.g., benzoyl, toluoyl), an alkylthio group having from 1 to 12 carbon atoms (e.g., methylthio, ethylthio), and an arylthio group having from 1 to 12 carbon atoms (e.g., phenylthio, tolylthio). The number of substituents can be 1 to 3. When the group is substituted with more than one substituent, they may be the same or different and may comprise any combination. The positions of the substituents are not limited.

$R^4$ and $R^5$ each represents a hydrogen atom or may be selected from examples of the alkyl groups, aromatic groups and heterocyclic aromatic groups as described for $R^3$.

When A represents 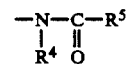, the moiety $$-N-C-R^5$$
$$\underset{R^4}{|} \underset{O}{\|}$$

therein may be substituted in any position of the 3- to 8-positions of the naphthalene ring, but it is preferably substituted in the 8-position.

B represents a divalent aromatic hydrocarbon group or a divalent heterocyclic group containing nitrogen atom(s) in the ring. The group optionally may be substituted with an alkyl group (having from 1 to 12 carbon atoms), a halogen atom, a nitro group or a hydroxyl group. Examples of divalent aromatic hydrocarbon groups are o-phenylene, o-naphthylene, perinaphthylene, 1,2-anthraquinonylene and 9,10-phenanthrylene groups. Examples of the divalent heterocyclic groups containing nitrogen atom(s) in the ring are 3,4-pyrazolidyl, 2,3-pyridyl, 4,5-pyrimidinediyl, 6,7-indazolediyl, 5,6-benzimidazolediyl and 6,7-quinolinediyl groups.

$Ar_1$, $Ar_2$, $Ar_3$, $Ar_4$, $Ar_5$ and $Ar_6$ each represents an arylene group such as a phenylene, naphthalene, anthrylene, biphenylene or terphnylene group, or a divalent group derived from a condensed polycyclic aromatic ring such as indene, fluorene, acenaphthene, perylene, fluorenone, anthrone, anthraquinone, benzanthrone or isocoumarin, or a divalent group derived from a heterocyclic aromatic ring such as pyridine, quinoline, oxazole, thiazole, oxadiazole, benzoxazole, benzimidazole, benzothiazole, benzotriazole, dibenzofuran, carbazole or xanthene.

When $Ar_1$, $Ar_2$, $Ar_3$, $Ar_4$, $Ar_5$ and $Ar_6$ each has substituent(s), examples of substituents include a hydroxyl group, an alkoxy group having from 1 to 18 carbon atoms, a cyano group, an alkoxyamino group having from 1 to 18 carbon atoms, a dialkylamino group with two alkyl groups each having from 1 to 18 carbon atoms, a halogen atom, an aryl group having from 6 to 15 carbon atoms, an acyl group having up to 18 carbon atoms and an acyloxy group having up to 18 carbon atoms.

Specific examples of these compounds of the formula (I) are set forth below. However, the present invention is not to be construed as being limited to these examples.

In the following compounds, $A_1$ means the coupler residue as indicated in Table 1, 2 or 3 below.

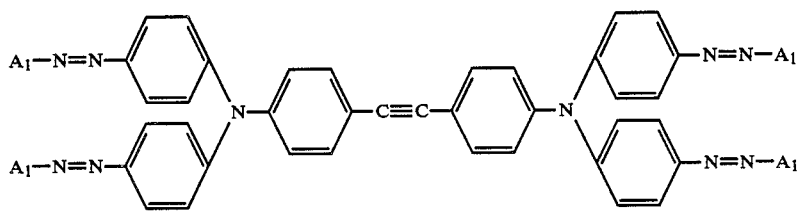

(1)

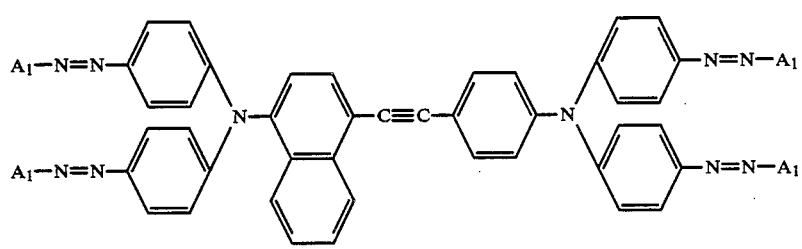

(2)

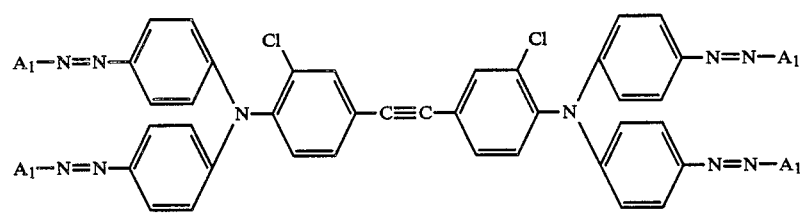

(3)

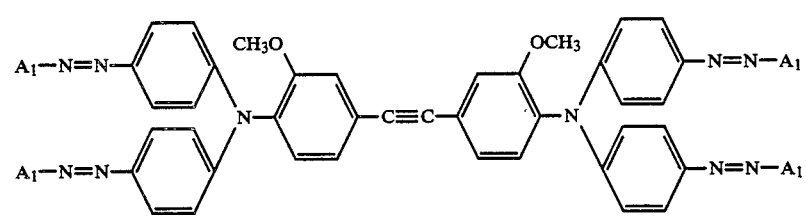

(4)

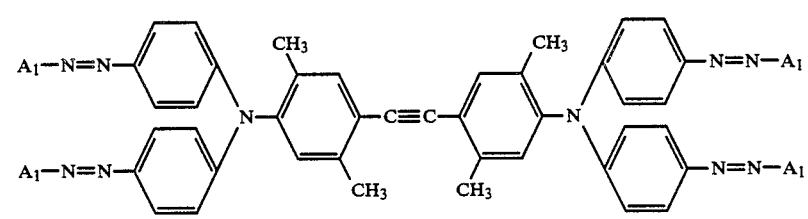

(5)

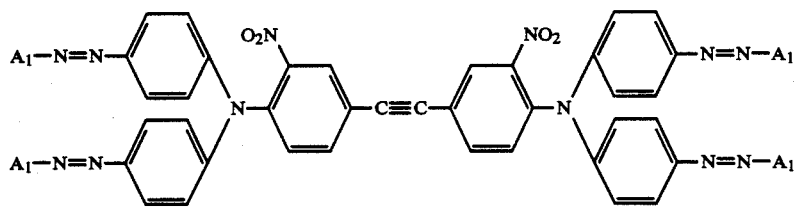
(6)
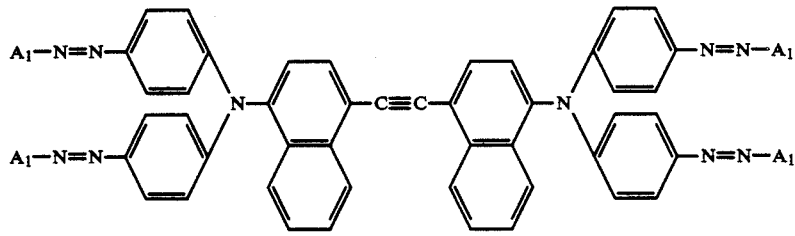
(7)
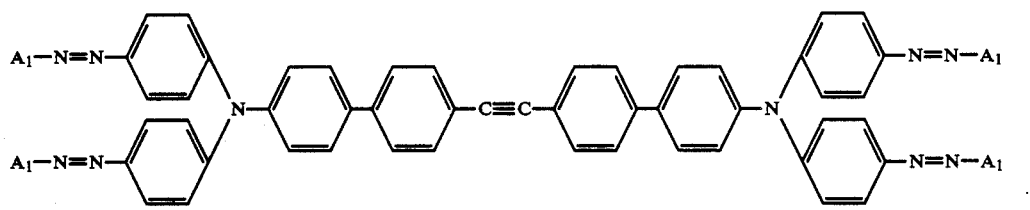
(8)
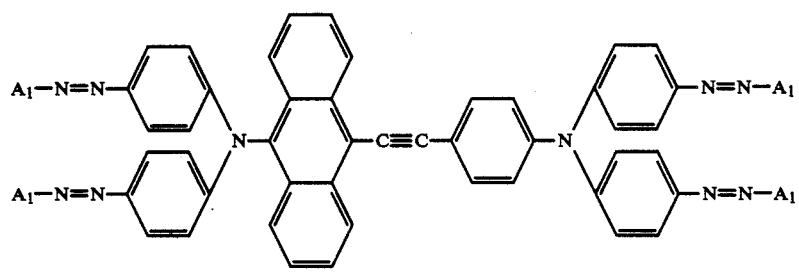
(9)
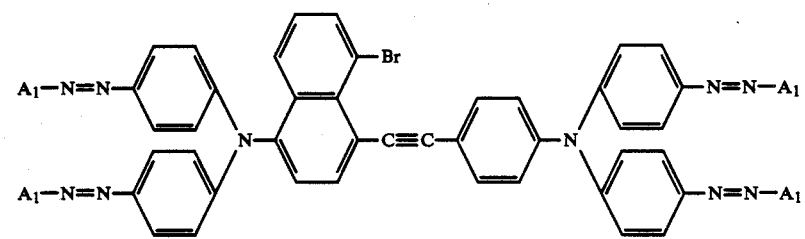
(10)
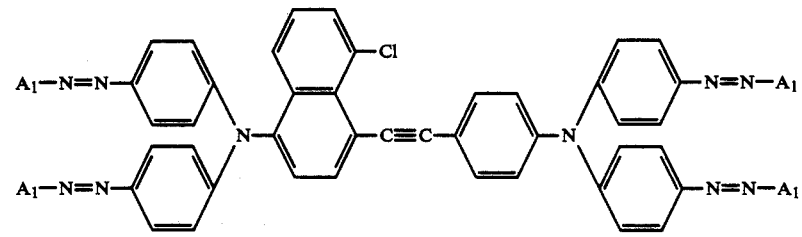
(11)

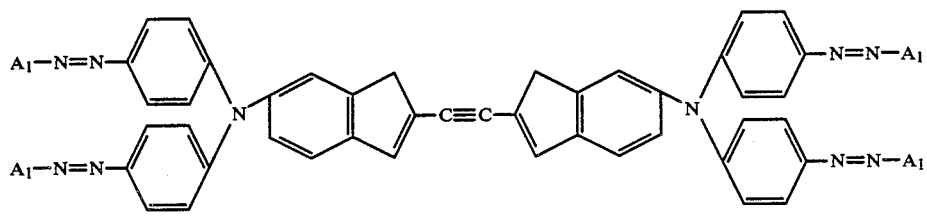
(12)
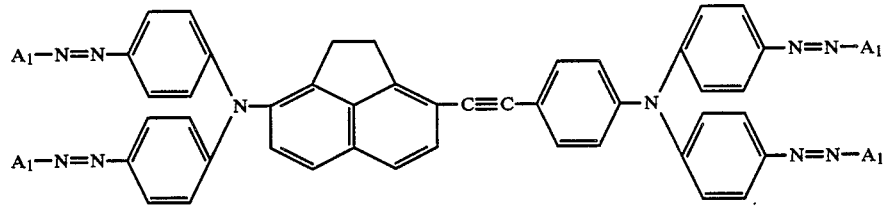
(13)
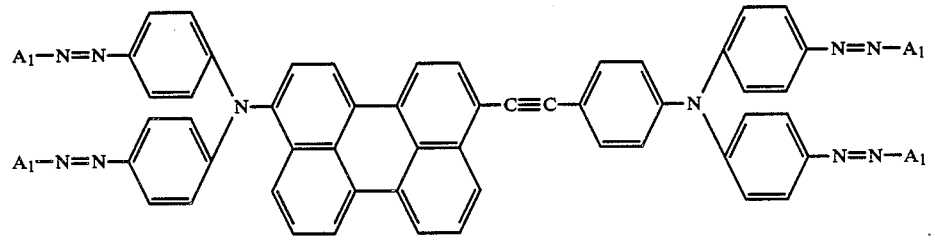
(14)
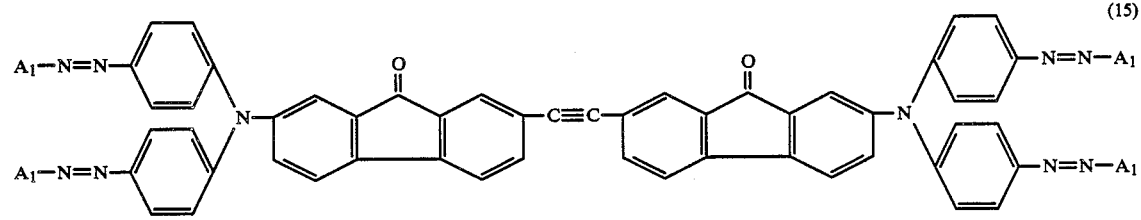
(15)
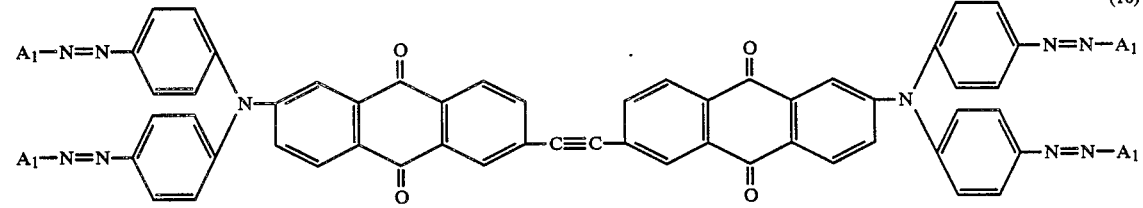
(16)
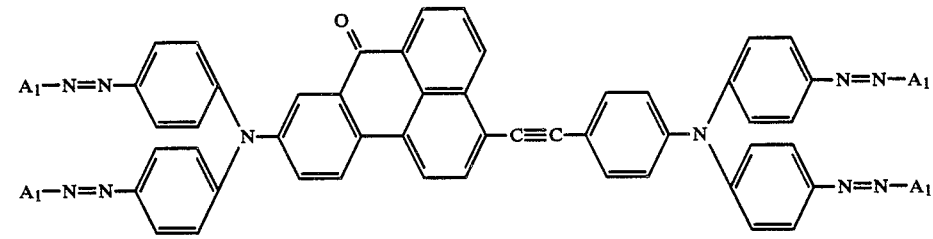
(17)
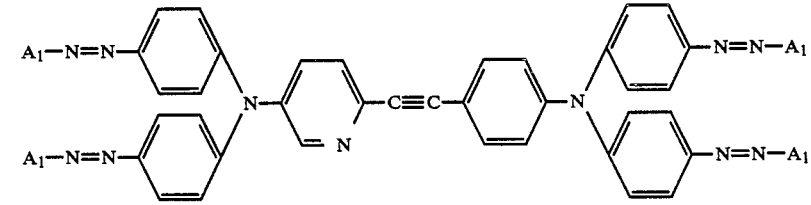
(18)

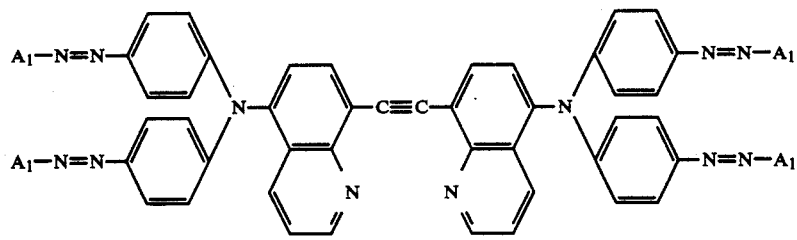
(19)
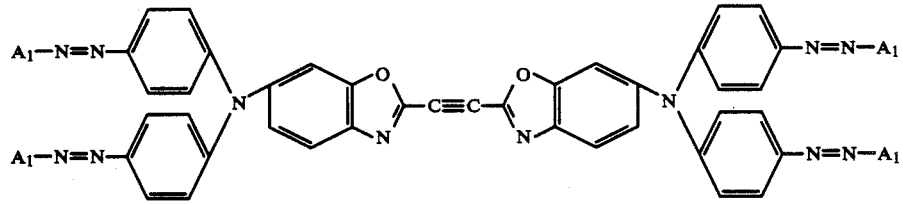
(20)
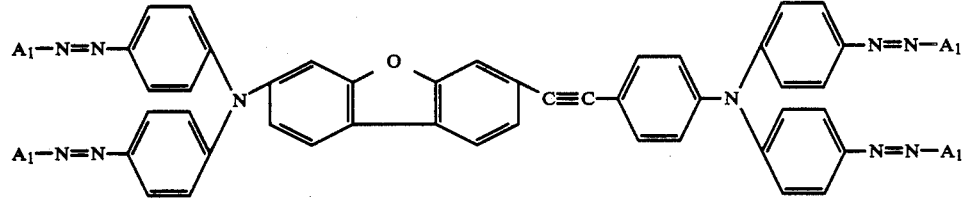
(21)
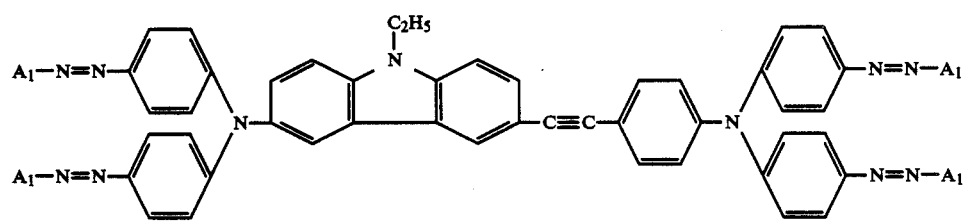
(22)
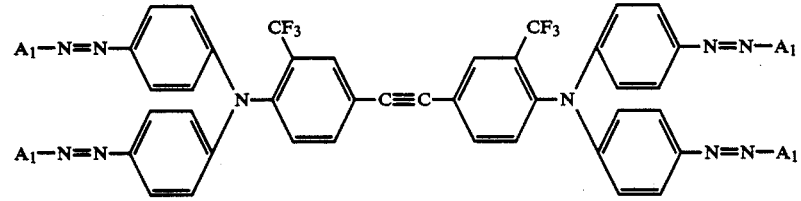
(23)
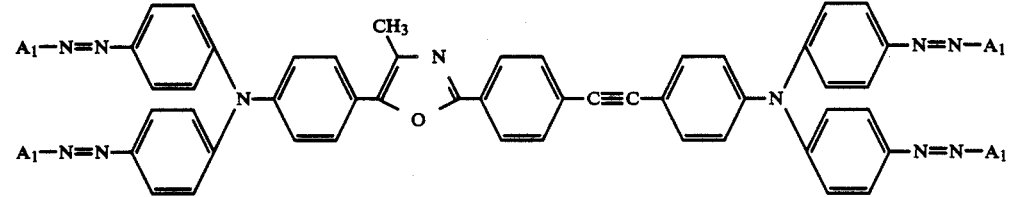
(24)
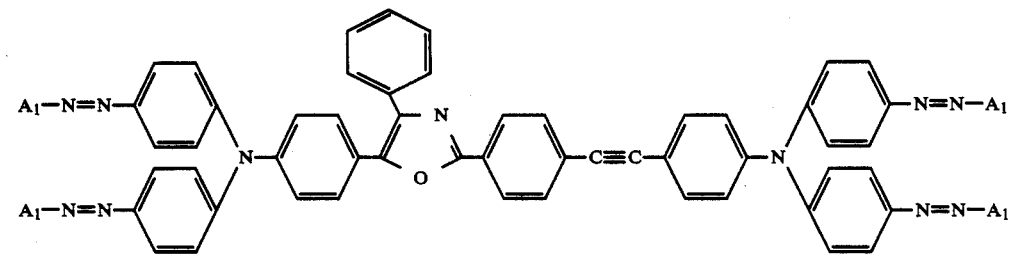
(25)

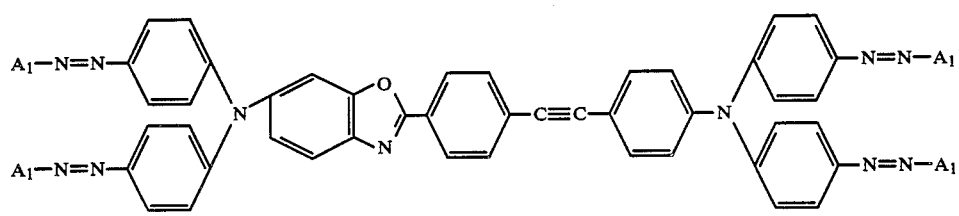
(26)
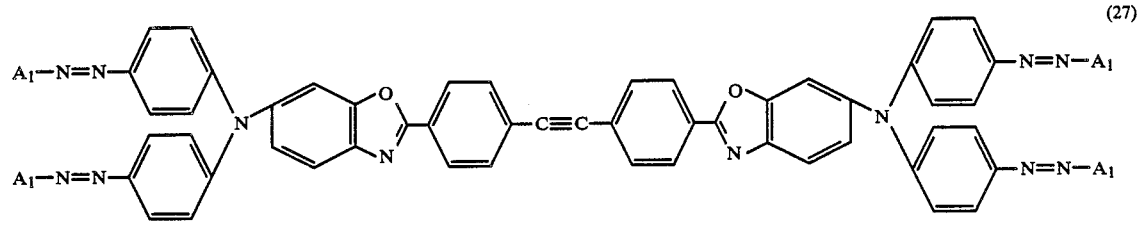
(27)
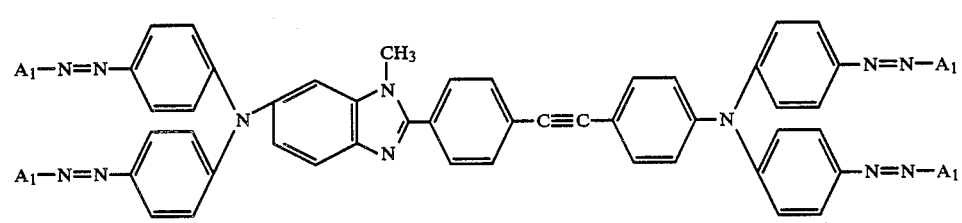
(28)
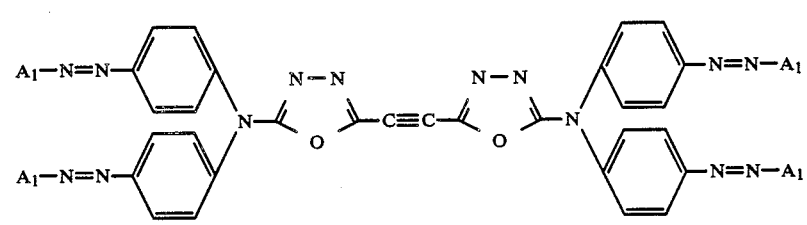
(29)
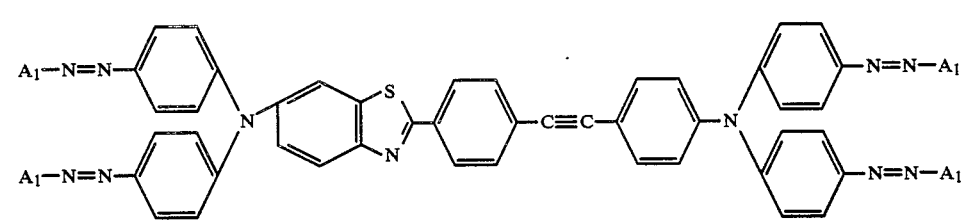
(30)
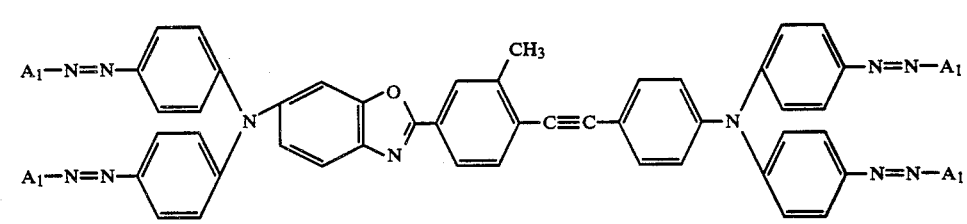
(31)
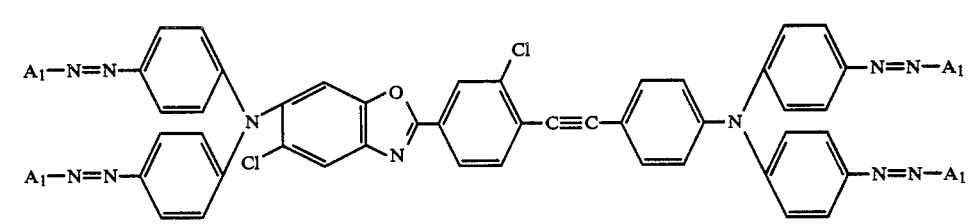
(32)

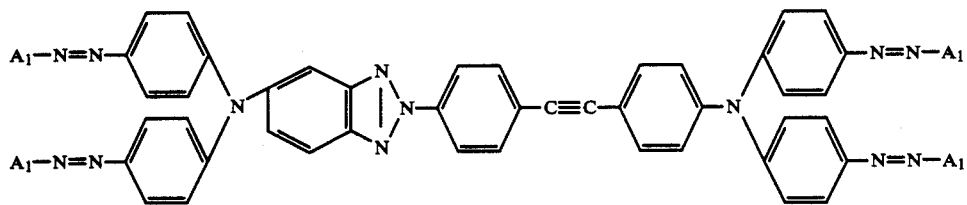
(33)
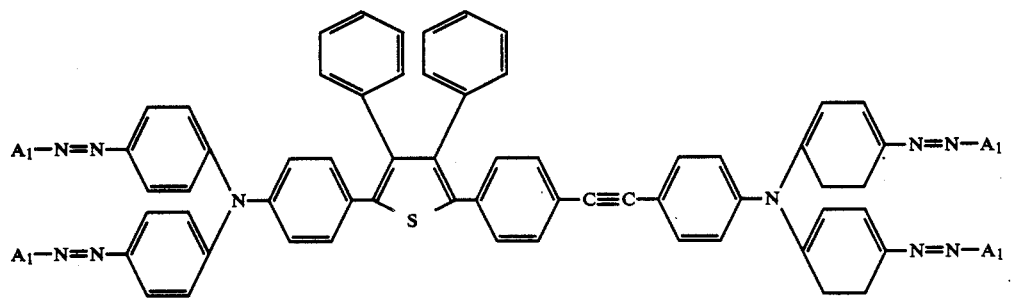
(34)
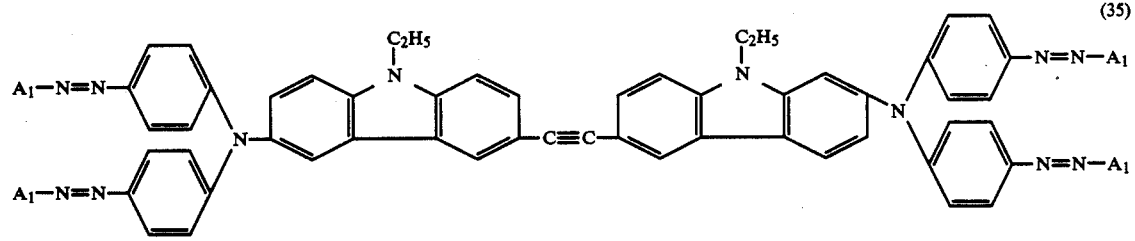
(35)
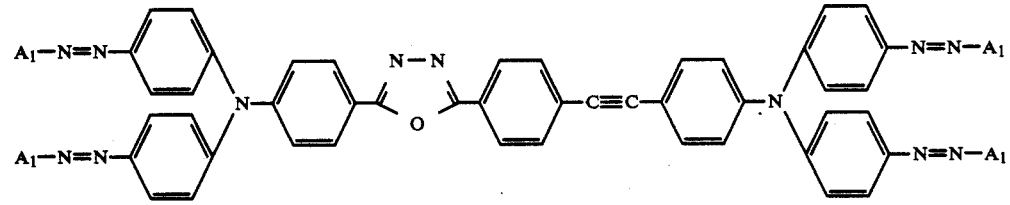
(36)
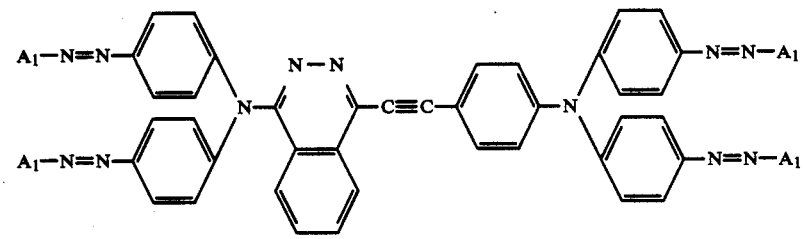
(37)
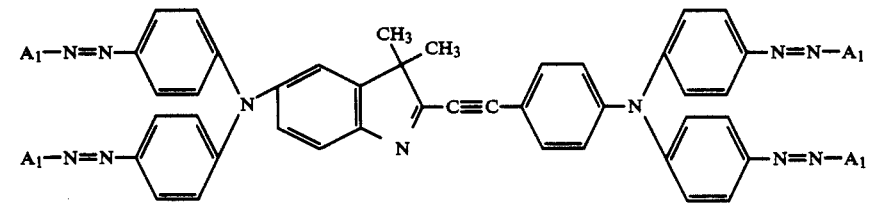
(38)

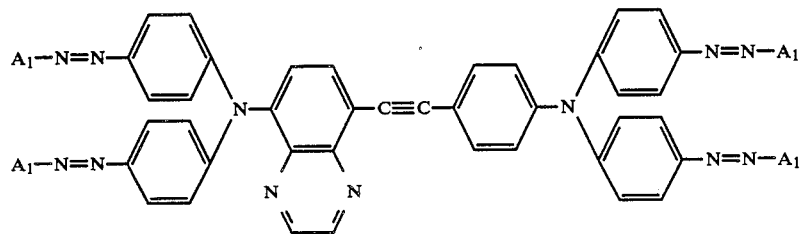
(39)
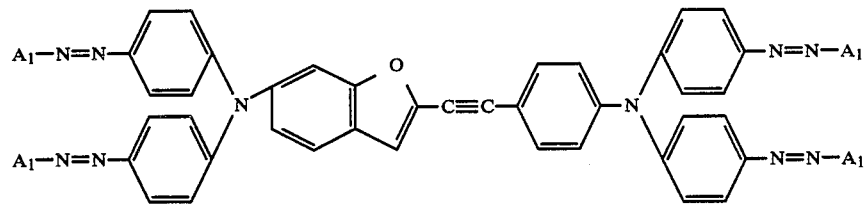
(40)
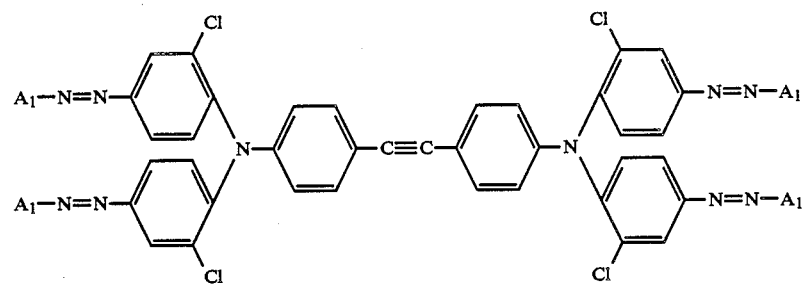
(41)
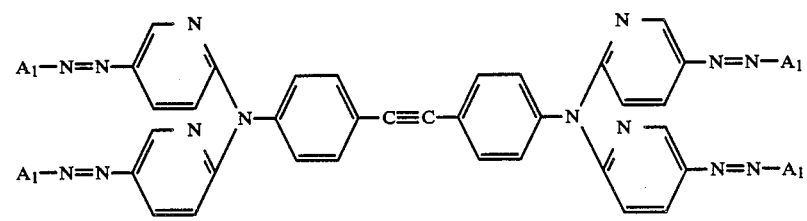
(42)
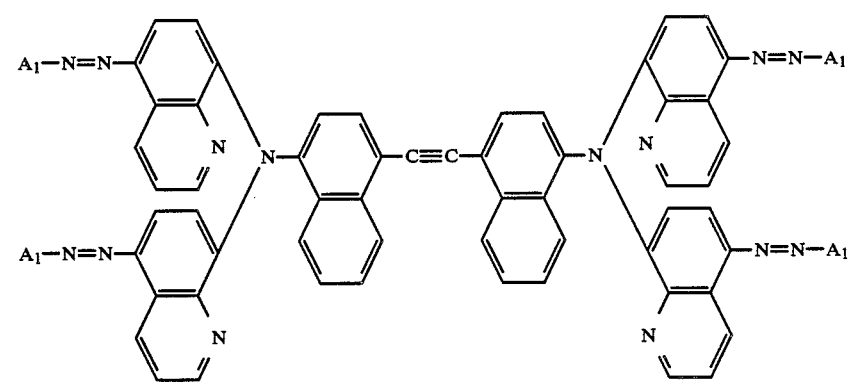
(43)

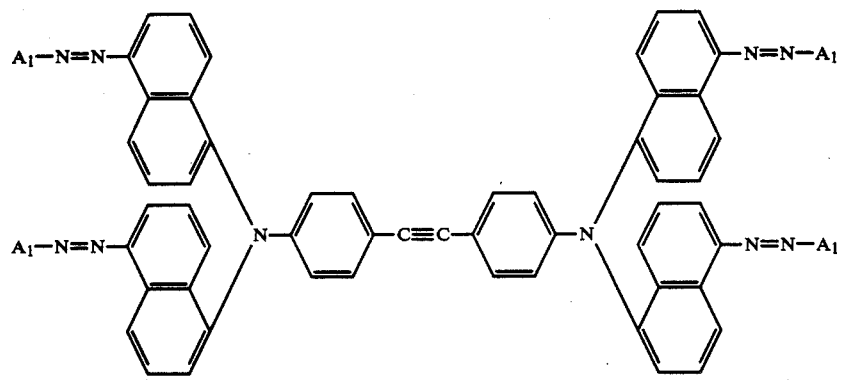
(44)
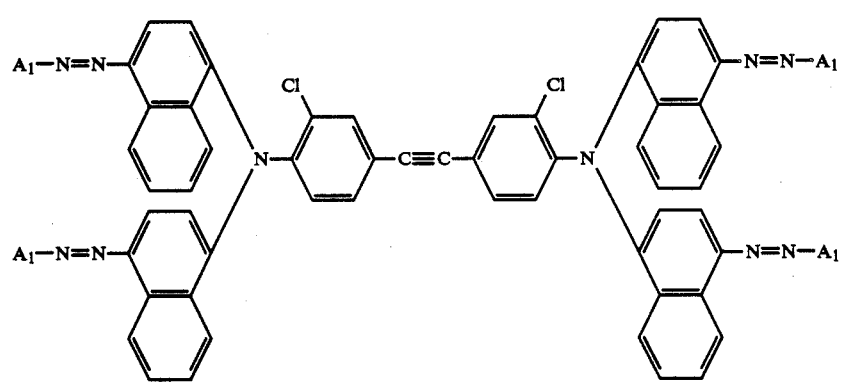
(45)
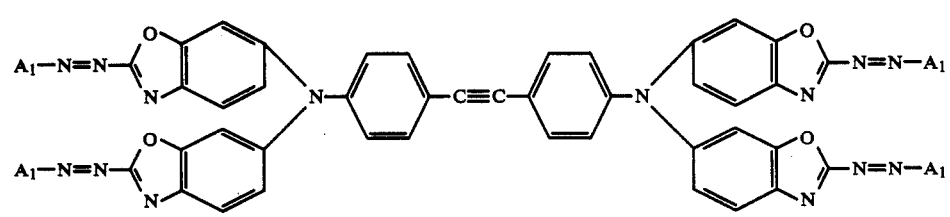
(46)
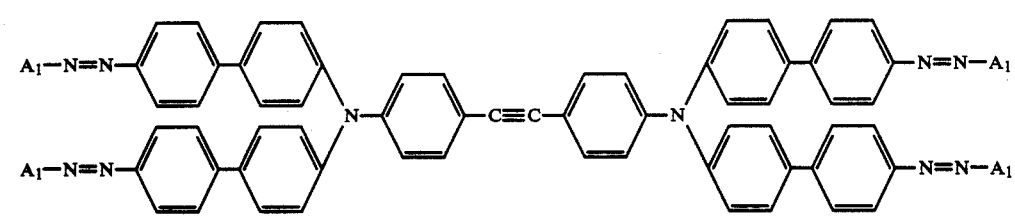
(47)
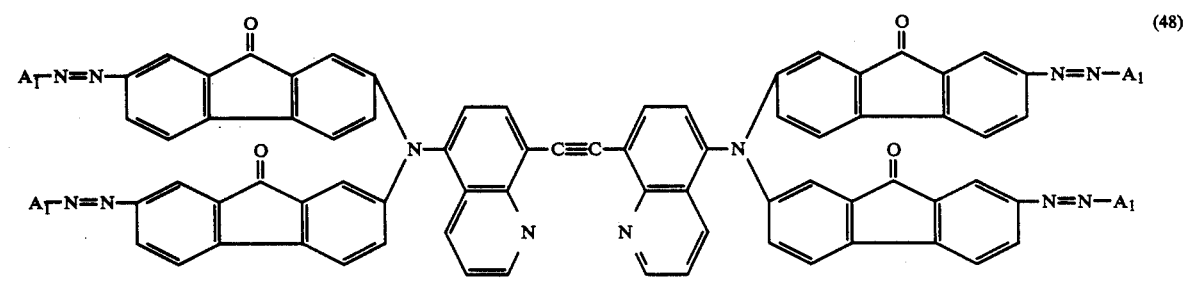
(48)

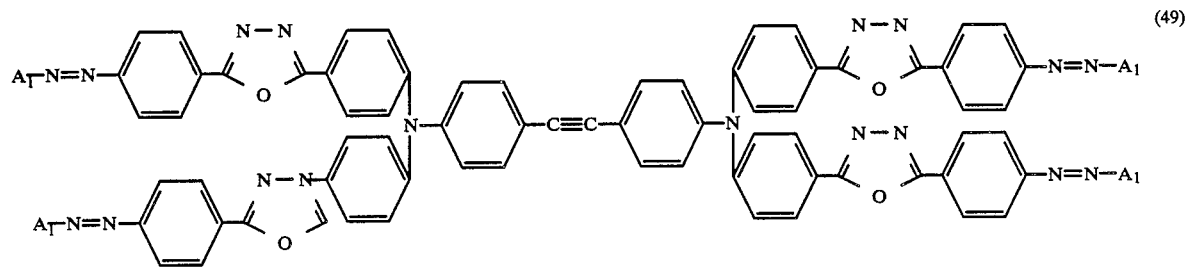
(49)
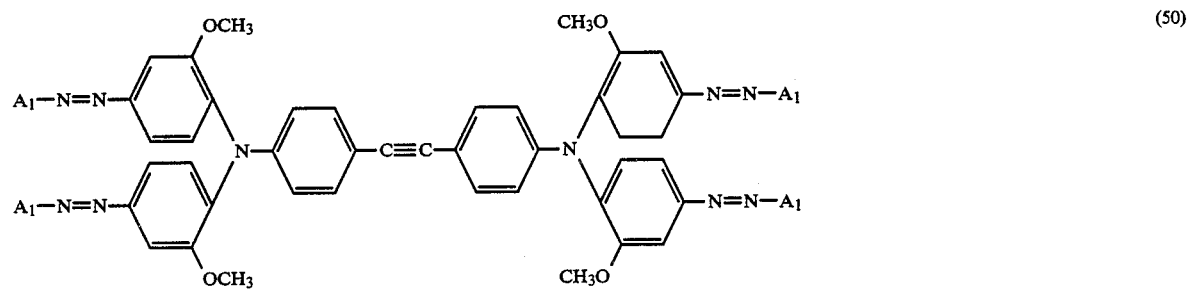
(50)
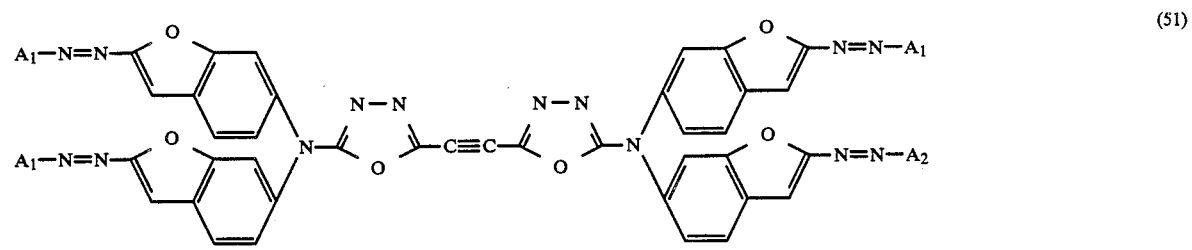
(51)
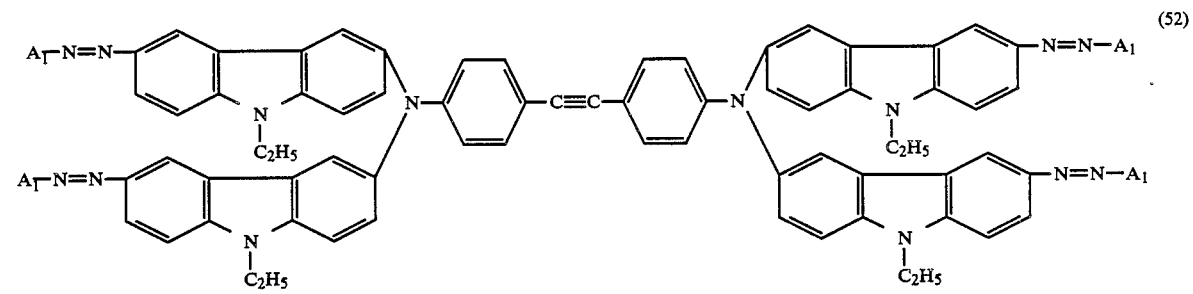
(52)
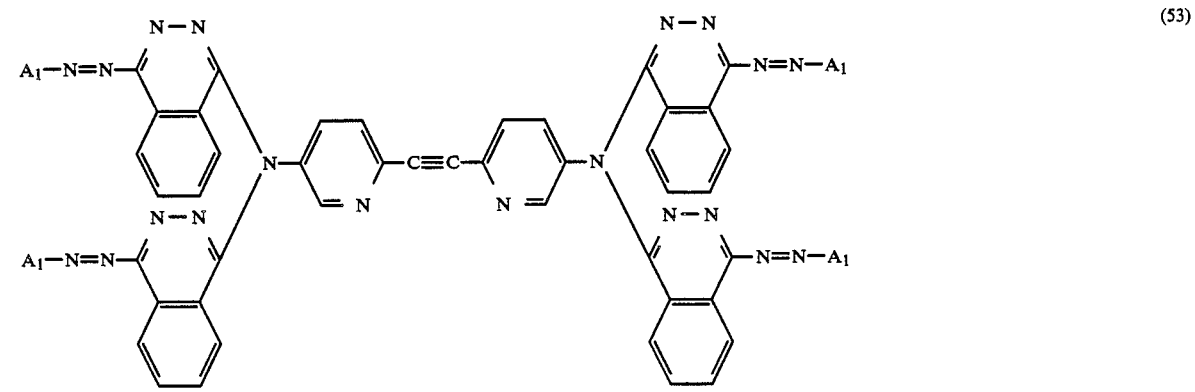
(53)

-continued
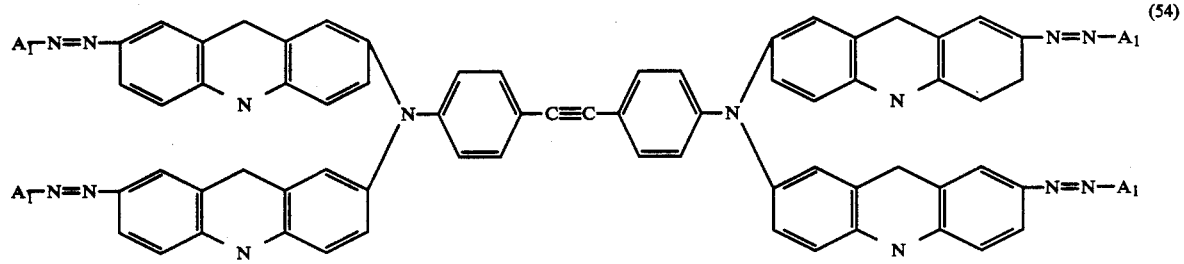
(54)
| TABLE 1 | | TABLE 1-continued | |
|---|---|---|---|
| A₁ No. | A₁ | A₁ No. | A₁ |
| (A₁ - 1) | 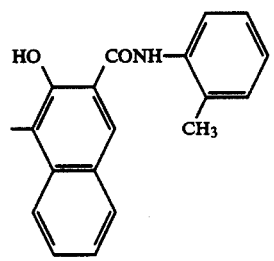 | (A₁ - 5) | 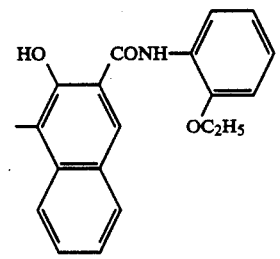 |
| (A₁ - 2) | 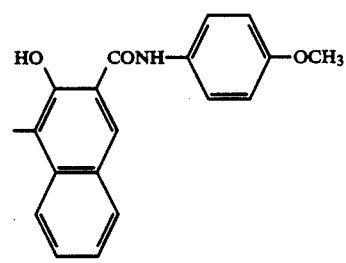 | (A₁ - 6) | 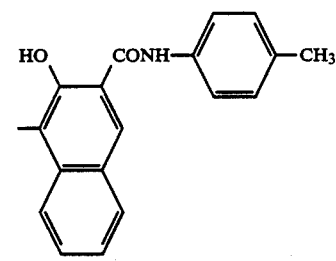 |
| (A₁ - 3) | | (A₁ - 7) | |
| (A₁ - 4) | 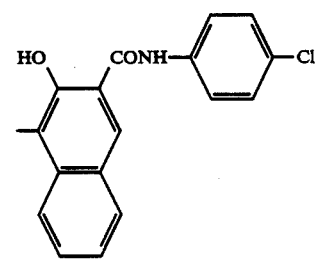 | (A₁ - 8) | 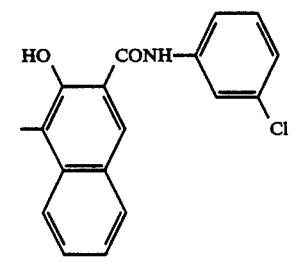 |

TABLE 1-continued
| A₁ No. | A₁ |
|---|---|
| (A₁ - 9) | 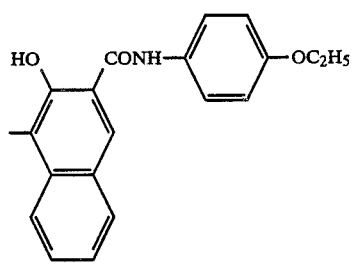 |
| (A₁ - 10) | 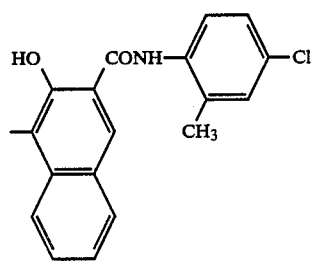 |
| (A₁ - 11) | 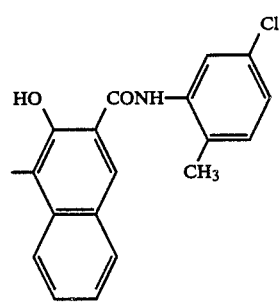 |
| (A₁ - 12) | 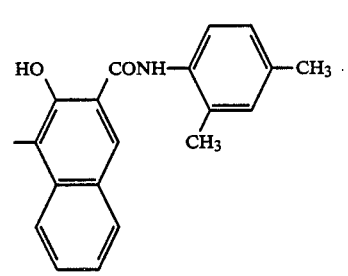 |
| (A₁ - 13) | 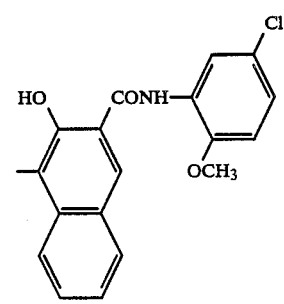 |
| (A₁ - 14) | 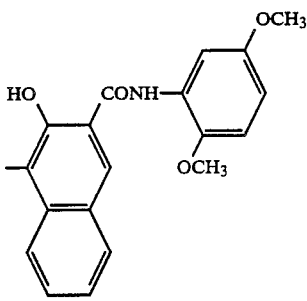 |
| (A₁ - 15) | 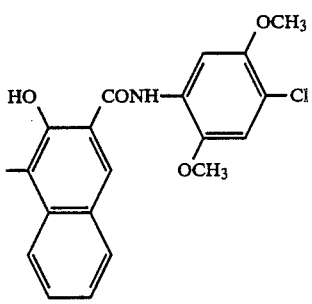 |
| (A₁ - 16) | 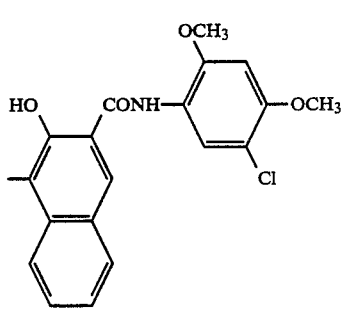 |
| (A₁ - 17) | 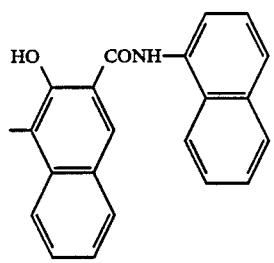 |
| (A₁ - 18) | 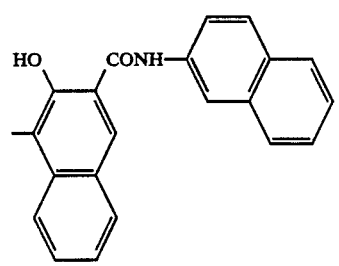 |

TABLE 1-continued
| $A_1$ No. | $A_1$ |
|---|---|
| ($A_1$-19) | 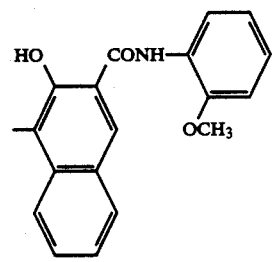 |
| ($A_1$-20) | 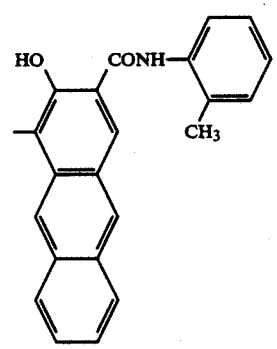 |
| ($A_1$-21) | 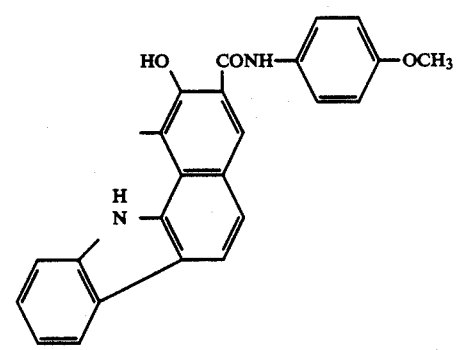 |
| ($A_1$-22) | 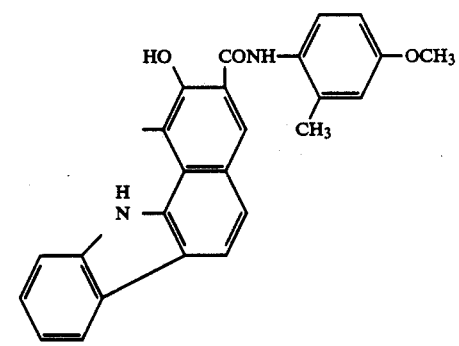 |
| ($A_1$-23) | 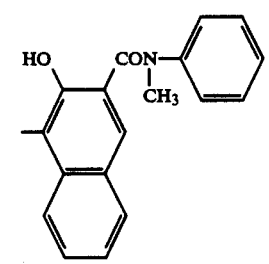 |
| ($A_1$-24) | 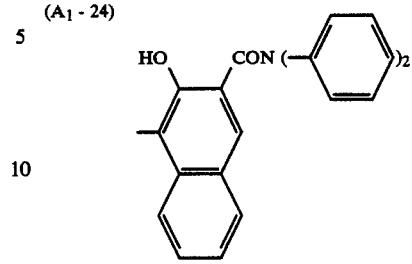 |
| ($A_1$-25) | 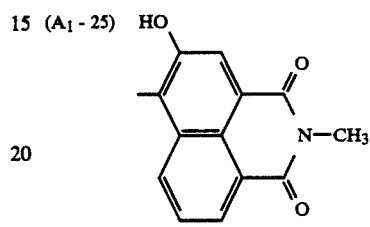 |
| ($A_1$-26) | 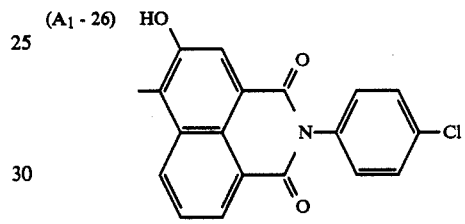 |
| ($A_1$-27) | 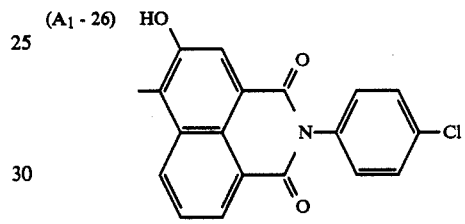 |
| ($A_1$-28) | 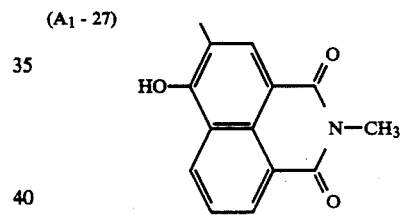 |
| ($A_1$-29) | 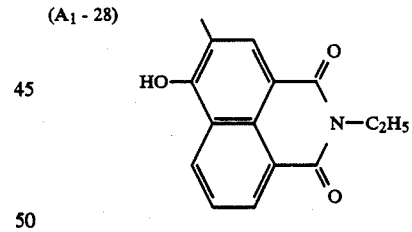 |
| ($A_1$-30) | 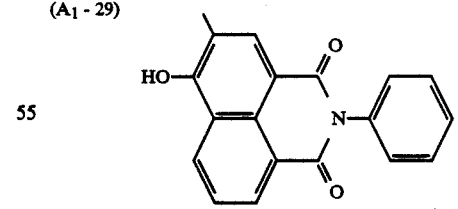 |

TABLE 1-continued

| $A_1$ No. | $A_1$ |
|---|---|
| ($A_1$ - 31) | 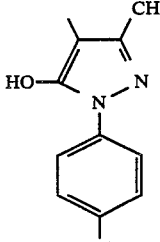 |
| ($A_1$ - 32) | 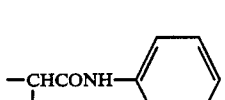 |
| ($A_1$ - 33) | 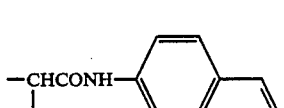 |
| ($A_1$ - 34) | (pyrazole with CH3, CH3, HO, N-N, 4-chlorophenyl) |
| ($A_1$ - 35) | —CHCONH—C6H5 with COCH3 |
| ($A_1$ - 36) | —CHCONH—(2-naphthyl) with COCH3 |

TABLE 2

| $A_1$ | Ar: 2-CF3-C6H4 | Ar: 3-CF3-C6H4 | Ar: 4-CF3-C6H4 | Ar: 3,5-(CF3)2-C6H3 | Ar: 2-CF3-4-Cl-C6H3 | Ar: 2-Cl-5-CF3-C6H3 |
|---|---|---|---|---|---|---|
| HO CONH—Ar (methylnaphthol) | $A_1$-37 | $A_1$-38 | $A_1$-39 | $A_1$-40 | $A_1$-41 | $A_1$-42 |
| HO CONH—Ar (carbazole-fused) | $A_1$-49 | $A_1$-50 | $A_1$-51 | $A_1$-52 | $A_1$-53 | $A_1$-54 |
| HO CONH—Ar (anthracene) | $A_1$-61 | $A_1$-62 | $A_1$-63 | $A_1$-64 | $A_1$-65 | $A_1$-66 |
| HO CONH—Ar (carbazole-fused) | $A_1$-73 | $A_1$-74 | $A_1$-75 | $A_1$-76 | $A_1$-77 | $A_1$-78 |

TABLE 2-continued

| $A_1$ | | | | | | |
|---|---|---|---|---|---|---|
| HO CONH—Ar (methyl-naphthyl-benzofuran) | $A_1$-85 | $A_1$-86 | $A_1$-87 | $A_1$-88 | $A_1$-89 | $A_1$-90 |

| | Ar | | | | | |
|---|---|---|---|---|---|---|
| $A_1$ | 4-Cl, 2-CF$_3$-phenyl | 4-Br, 2-CF$_3$-phenyl | 2-Br, 5-CF$_3$-phenyl | 4-F, 2-CF$_3$-phenyl | 2-F, 5-CF$_3$-phenyl | 2-F, 5-CF$_3$-phenyl |
| HO CONH—Ar (methyl-naphthol) | $A_1$-43 | $A_1$-44 | $A_1$-45 | $A_1$-46 | $A_1$-47 | $A_1$-48 |
| HO CONH—Ar (methyl-carbazole) | $A_1$-55 | $A_1$-56 | $A_1$-57 | $A_1$-58 | $A_1$-59 | $A_1$-60 |
| HO CONH—Ar (methyl-anthracenol) | $A_1$-67 | $A_1$-68 | $A_1$-69 | $A_1$-70 | $A_1$-71 | $A_1$-72 |
| HO CONH—Ar (methyl-dihydroacridinol) | $A_1$-79 | $A_1$-80 | $A_1$-81 | $A_1$-82 | $A_1$-83 | $A_1$-84 |
| HO CONH—Ar (methyl-dibenzofuranol) | $A_1$-91 | $A_1$-92 | $A_1$-93 | $A_1$-94 | $A_1$-95 | $A_1$-96 |

| | Ar | | | | | |
|---|---|---|---|---|---|---|
| $A^1$ | 2-C$_2$F$_5$-phenyl | 3-C$_3$F$_7$-phenyl | 4-C$_6$F$_{13}$-phenyl | 2,4,6-(CF$_3$)$_3$-phenyl | 4-NO$_2$, 2-CF$_3$-phenyl | 4-OCH$_3$, 2-CF$_3$-phenyl |
| HO CONH—Ar (methyl-naphthol) | $A_1$-97 | $A_1$-98 | $A_1$-99 | $A_1$-100 | $A_1$-101 | $A_1$-102 |

TABLE 2-continued

| $A_1$ | | | | | | |
|---|---|---|---|---|---|---|
| HO CONH—Ar (with carbazole-type fused ring, NH top) | $A_1$-109 | $A_1$-110 | $A_1$-111 | $A_1$-112 | $A_1$-113 | $A_1$-114 |
| HO CONH—Ar (anthracene-type) | $A_1$-121 | $A_1$-122 | $A_1$-123 | $A_1$-124 | $A_1$-125 | $A_1$-126 |
| HO CONH—Ar (with HN fused ring) | $A_1$-133 | $A_1$-134 | $A_1$-135 | $A_1$-136 | $A_1$-137 | $A_1$-138 |
| HO CONH—Ar (with O-containing fused ring) | $A_1$-145 | $A_1$-146 | $A_1$-147 | $A_1$-148 | $A_1$-149 | $A_1$-150 |

| $A_1$ | Ar: 4-CH₃-2-CF₃-phenyl-NEt₂ | Ar: 3,5-bis(CO₂CH₃, CF₃)-phenyl | Ar: 2,4-bis(CH₃)-CF₃-phenyl | Ar: CF₃-naphthyl | Ar: CF₃,CH₃-benzodioxole-CH₃ | Ar: CF₃,CH₃-phenyl-N(C₂H₅)-phenyl |
|---|---|---|---|---|---|---|
| HO CONH—Ar (naphthol) | $A_1$-103 | $A_1$-104 | $A_1$-105 | $A_1$-106 | $A_1$-107 | $A_1$-108 |
| HO CONH—Ar (carbazole-type, NH) | $A_1$-115 | $A_1$-116 | $A_1$-117 | $A_1$-118 | $A_1$-119 | $A_1$-120 |
| HO CONH—Ar (anthracene-type) | $A_1$-127 | $A_1$-128 | $A_1$-129 | $A_1$-130 | $A_1$-131 | $A_1$-132 |

TABLE 2-continued

| Structure | | | | | | |
|---|---|---|---|---|---|---|
| HO CONH—Ar (with methyl and HN-linked carbazole) | A₁-139 | A₁-140 | A₁-141 | A₁-142 | A₁-143 | A₁-144 |
| HO CONH—Ar (with methyl and O-linked dibenzofuran) | A₁-151 | A₁-152 | A₁-153 | A₁-154 | A₁-155 | A₁-156 |

TABLE 3

| A₁ No. | A₁ |
|---|---|
| (A₁-157) | HO—(4-methyl-3-hydroxynaphthyl)—CONHN=C(phenyl)(4-Cl-phenyl) |
| (A₁-158) | HO—(4-methyl-3-hydroxynaphthyl)—CONHN=CH(3-Cl-phenyl) |
| (A₁-159) | HO—(4-methyl-3-hydroxynaphthyl)—CONHN=C(CH₃)(phenyl) |
| (A₁-160) | HO—(4-methyl-3-hydroxynaphthyl)—CONHN=C(phenyl)(4-pyridyl) |
| (A₁-161) | HO—(4-methyl-3-hydroxynaphthyl)—CONHN=C(phenyl)(1-naphthyl) |
| (A₁-162) | HO—(4-methyl-3-hydroxynaphthyl)—CONHN=C(phenyl)(biphenyl-N(C₂H₅)-) |

TABLE 3-continued

| A₁ No. | A₁ |
|---|---|
| (A₁-163) | 3-hydroxy-4-methyl-naphthalene-2-carboxylic acid N'-(diphenylmethylene)hydrazide |
| (A₁-164) | 3-hydroxy-4-methyl-naphthalene-2-carboxylic acid N'-[1-(methoxymethyl)-1-phenylmethylene]hydrazide |
| (A₁-165) | 3-hydroxy-4-methyl-naphthalene-2-carboxylic acid N'-[1-(chloromethyl)-1-phenylmethylene]hydrazide |
| (A₁-166) | 3-hydroxy-4-methyl-naphthalene-2-carboxylic acid N'-[bis(3-methoxyphenyl)methylene]hydrazide |
| (A₁-167) | benzimidazo-fused naphthalenone (phenyl-substituted) |
| (A₁-168) | benzimidazo-fused naphthalenone (4-methylphenyl-substituted) |
| (A₁-169) | benzimidazo-fused naphthalenone (3,4-dimethylphenyl-substituted) |
| (A₁-170) | naphtho-benzimidazo-fused naphthalenone |
| (A₁-171) | benzimidazo-fused naphthalenone (4-chlorophenyl-substituted) |

TABLE 3-continued
| $A_1$ No. | $A_1$ |
|---|---|
| ($A_1$-172) | 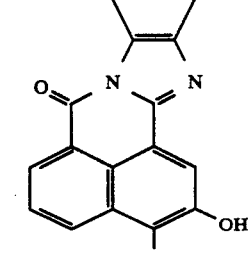 |
| ($A_1$-173) | 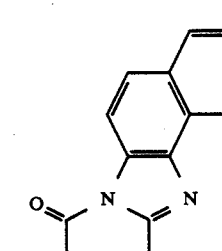 |
| ($A_1$-174) | 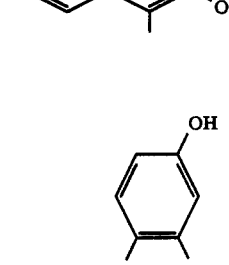 |
| ($A_1$-175) | 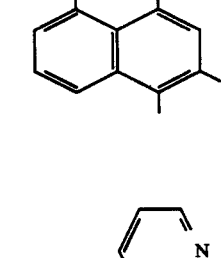 |
| ($A_1$-176) | 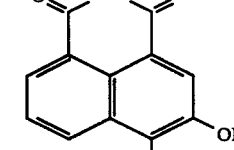 |
| ($A_1$-177) | 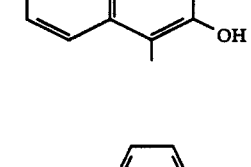 |
| ($A_1$-178) | 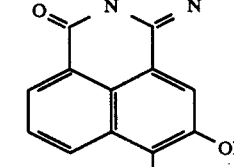 |
| ($A_1$-179) | 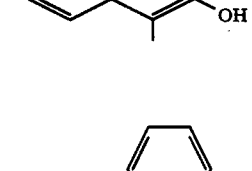 |

TABLE 3-continued

| $A_1$ No. | $A_1$ |
|---|---|
| ($A_1$-180) | 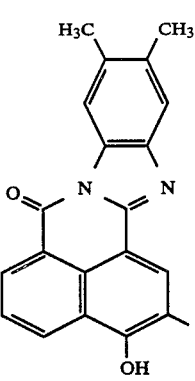 |
| ($A_1$-181) | 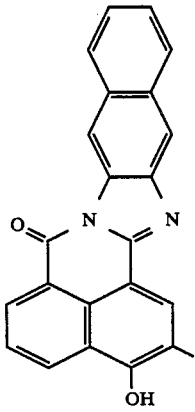 |
| ($A_1$-182) | 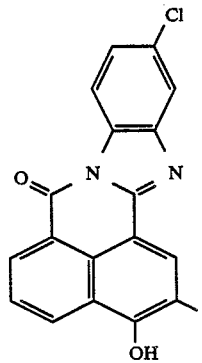 |
| ($A_1$-183) | 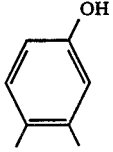 |
| ($A_1$-184) | 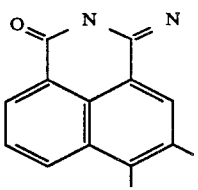 |

The tetrakisazo compounds which are employed in the present invention can be produced with ease using known synthesis methods. For instance, the compounds can be produced with ease by octazoating a tetramino compound as represented by the following formula (II) and then coupling the resulting octazonium salt with the corresponding coupler in the presence of an alkali. Alternatively, after the octazonium salt is isolated in the form of a borofluoride salt or a zinc chloride complex salt, it is coupled with the corresponding coupler in a solvent such as N,N-dimethylformamide or dimethylsulfoxide in the presence of an alkali to obtain a compound of the formula (I). One typical example of the production of a compound of the formula (I) where $A_1$ indicates ($A_1$-21) shown in Table 1 above is illustrated below. Other tetrakisazo compounds can also be produced in the same manner.

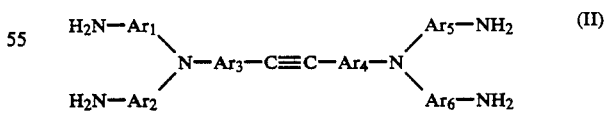

where $Ar_1$, $Ar_2$, $Ar_3$, $Ar_4$, $Ar_5$ and $Ar_6$ each have the same meaning as in the formula (I).

The amino compound represented by formula (II) is synthesized according to the following synthesis schematic.

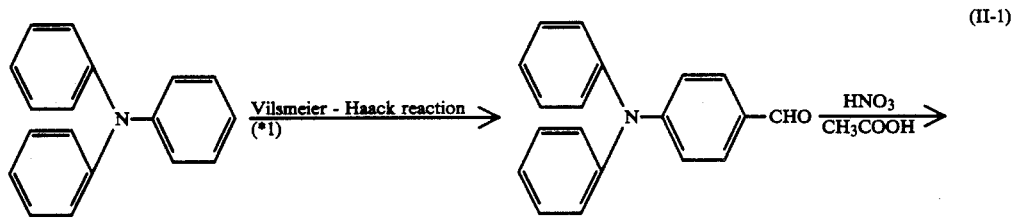
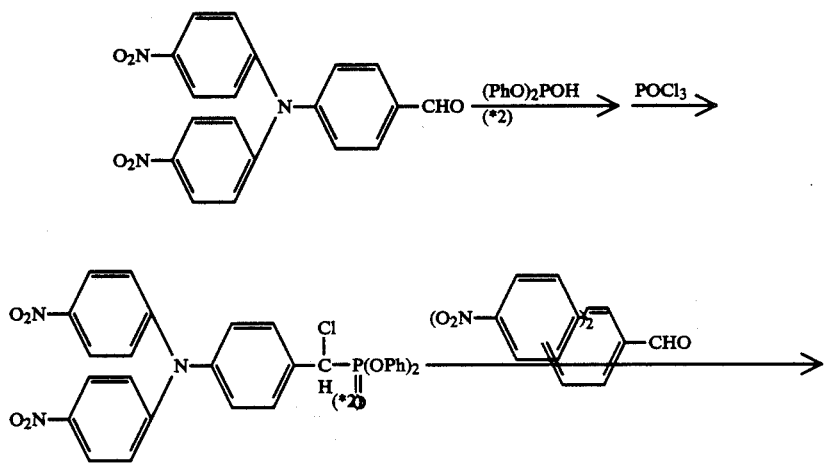
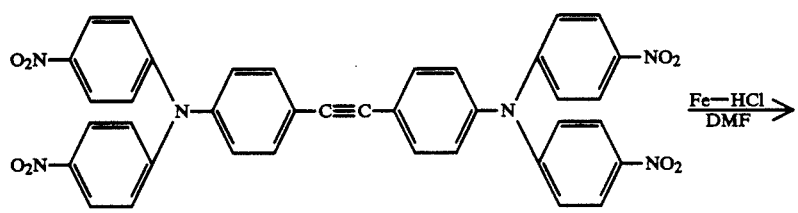
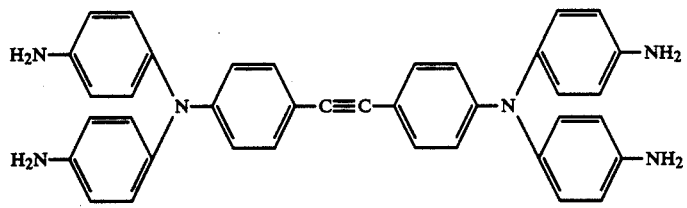
(*1) Applying the reaction disclosed in E. Camprigne and W. L Ancher, Org. Syntheses, Call. Vol. IV, page 331 (1963).
(*2) Applying the reaction disclosed in Hans Zimmer, Peter Jeno Bercz, Otto J. Maltenieks, Melvyn W. Moore, J. Am. Chem. Soc., 87, page 2777 (1965).
SYNTHESIS EXAMPLE
Production Schematic
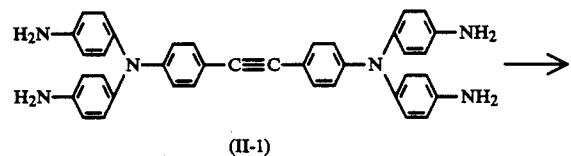
(II-1)

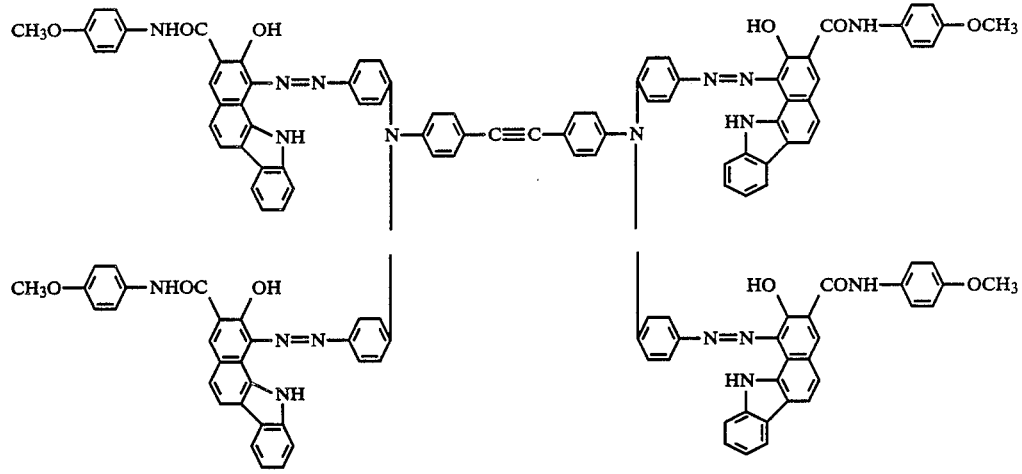

5.72 (0.01 mol) of amino compound (II-1) was added to a diluted hydrochloric acid prepared from 25 ml of concentrated hydrochloric acid and 30 ml of water and well stirred on a water bath at 60° C. for about 30 minutes. Next, the resulting mixture was cooled to 0° C., and a solution prepared by dissolving 3.04 g of sodium sulfite in 10 ml of water was dropwise added thereto at 0° C. over a period of about 20 minutes. Afterwards, the entire amount was stirred for 1 hour at the same temperature. After a small amount of non-reacted substances were removed by filtration, the resulting filtrate was dropwise added to a mixture of 15.3 g (0.04 mol) of coupler ($A_1$-21)-H and 100 ml of pyridine, with stirring and cooling with ice. Then the resulting mixture was stirred at room temperature for 2 hours and the reaction was completed. The reaction mixture was poured into 500 ml of water, and the crystals precipitated were removed by filtration. The thus obtained crude crystals were repeatedly washed with acetone.

12.9 g of Compound (I-1) was obtained as a black powder. The yield of the product was 60%, to the amino compound (II-1). The product had a decomposition point of 250° C. or higher.

Elementary Analysis (as $C_{134}H_{92}O_{12}N_{18}$) was as follows: Calculated C 74.99% ; H 4.32% ; N 11.75% Measured C 74.76% ; H 4.27% ; N 11.63%

The electrophotographic photoreceptor of the present invention comprises an electrophotographic photo-sensitive layer which contains one or more of the tetrakisazo compounds of the above-described formula (I). Electrophotographic photoreceptors of various types are known, and any known type may employ the electrophotographic photoreceptor of the present invention. Preferably, the photoreceptor of the invention has a structure of the following types.

(I) An electrophotographic photo-sensitive layer containing the tetrakisazo compound(s) of the formula (I) dispersed in a binder or a charge carrier-transporting medium is provided on an electroconductive support.

(II) A charge carrier-generating layer mainly of the tetrakisazo compound(s) of the formula (I) is provided on an electroconductive support, and a charge carrier-transporting medium layer is superposed over this layer.

(III) A charge carrier-transporting medium layer is provided on a electroconductive support, and a charger carrier-generating layer mainly of the tetrakisazo compound(s) of the formula (I) is superposed over this layer.

The tetrakisazo compounds of the present invention function to generate a charge carrier with an extremely high efficiency, when light is absorbed. The thus generated charge carrier is transported by a charger carrier-transporting compound.

Fine grains of the tetrakisazo compound are dispersed in a binder solution or in a solution containing a charge carrier-transporting compound and a binder and the resulting dispersion may be coated on an electroconductive support and dried to form an electrophotographic photoreceptor of type (I). The thickness of the electrophotographic photo-sensitive layer formed is preferably from 3 to 30μ especially from 50 to 20μ.

The tetrakisazo compound is coated on an electroconductive support by vacuum evaporation plating, or a solution of the compound as dissolved in a solvent, such as an amine, is coated on the support, or a dispersion of fine grains of the tetrakisazo compound dispersed in a pertinent solvent optionally containing a binder dissolved therein is coated on the support; and after drying the thus-coated layer, a solution containing a charge carrier-transporting compound and a binder is superposed over this layer and dried to form the electrophotographic photoreceptor of type (II). The thickness of the tetrakisazo compound-containing layer, which is a charge carrier-generating layer, is preferably from 0.1 to 4μ, especially from 0.3 to 2μ; and the thickness of the charge carrier-transporting medium layer is preferably from 3 to 30μ, especially from 5 to 20μ.

The order of the lamination of the layers in forming the photoreceptor of type (II) may be reversed to form the electrophotographic photoreceptor of type (III).

The tetrakisazo compounds to be used for formation of the photoreceptors of types (I), (II) and (III) are in the form of fine grains having a grain size of from 0.1μ to 5μ, preferably from 0.3μ to 2μ, as milled in a ball mill, a sand mill, a shaking mill or the like dispersing machine.

In the formation of the electrophotographic photoreceptor of type (I), if the amount of the tetrakisazo compound used is too small, the sensitivity is poor, but if too large, the charging property is poor and the film strength of the photo-sensitive layer formed is low. Accordingly, the proportion of the tetrakisazo compound in the electrophotographic photosensitive layer is preferably from 0.01 to 2 times by weight, especially from 0.05 to 1 times by weight, of the binder, if any, therein. The proportion of the charge carrier-transporting compound is preferably from 0.1 to 2 times by weight, especially from 0.3 to 1.3 times by weight, of the binder. If the charge carrier-transporting compound used acts also as a binder, the amount of the tetrakisazo compound to be added is preferably from 0.01 to 0.5 times by weight of the charge carrier-transporting compound.

In formation of the tetrakisazo compound-containing layer, which is the charge carrier-generating compound layer, the proportion of the tetrakisazo compound to the binder resin is preferably 0.1 to 10 times by weight to produce electrophotographic photoreceptors of types (II) and (III). If less than this amount is used, the resulting layer does not have sufficient light-sensitivity. The binder is not indispensable and may be omitted. The proportion of the charge carrier-transporting compound in the charge carrier transporting compound-containing layer is preferably from 0.2 to 2 times by weight, especially from 0.3 to 1.3 times by weight, of the binder therein. If a charger carrier-transporting high molecular weight compound which acts also as a binder is used, another binder is unnecessary.

The electroconductive support for use in the electrophotographic photoreceptor of the present invention may be a metal plate such as an aluminum, copper or zinc plate, a synthetic resin sheet or film (e.g., polyester sheet of film) coated with an electro-conductive material (e.g., aluminum, indium oxide, SnO$_2$) by vacuum evaporation-plating or dispersion-coating, a synthetic resin film coated with a copper iodide-containing acetonitrile solution, or a paper processed with an inorganic salt (e.g., sodium chloride, calcium chloride) or an organic quaternary ammonium salt to render it electroconductive.

In the formation of the electrophotographic photoreceptor of the present invention, additives, such as plasticizers or sensitizing dyes may be used together with the binder (or together with the charge carrier-transporting compound functioning as a binder).

The binder, if employed, is preferably an electrically insulating and film-forming high molecular weight polymer which is hydrophobic and which has a high dielectric constant. Examples of suitable high molecular weight polymers of this type are described below, but the present invention is not limited to these polymers.

Polycarbonates, polyesters, methacrylic resins, acrylic resins, polyvinyl chloride, polyvinylidene chloride, polystyrene, polyvinyl acetate, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenol-formaldehyde resins, styrene-alkyd resins, poly-N-vinylcarbazole.

These binders may be used alone or in the form of a mixture of two or more of them, if desired.

Suitable plasticizers are, for example, biphenyl, biphenyl chloride, o-terphenyl, p-terphenyl, dibutyl phthalate, dimethylene glycol phthalate, dioctyl phthalate, triphenylphosphoric acid, methylnaphthalene, benzophenone, chlorinated paraffin, polypropylene, polystyrene, dilaurylthio dipropionate, 3,5-dinitrosalicylic acid, and various fluorohydrocarbons.

In addition, a silicone oil or the like may be added to improve the surface properties of the electrophotographic photoreceptor.

Suitable sensitizing agents are, for example, chloranyl, tetracyanoethylene, methyl violet, Rhodamine B, cyanine dyes, merocyanine dyes, pyrylium dyes and thiapyrylium dyes.

Charge carrier-transporting compounds are generally classified into two groups; electron-transporting compounds and positive hole-transporting compounds. Both of these two groups may be used in the electrophotographic photoreceptor of the present invention. The electron-transporting compounds are electron-attracting group-containing compounds, which include, for example, 2,4,7-trinitro-9-fluorenone, 2,4,5,7-tetranitro- 9-fluorenone, 9-dicyanomethylene-2,4,7-trinitrofluorenone, 9-dicyanomethylene-2,4,5,7tetranitrofluorenone, -tetranitrocarbazole-chloranyl, 2,3-dichloro-5,6-dicyanobenzoquinone, 2,4,7-trinitro-9,10-phenanthrenequinone, tetrachloro-phthalic anhydride, tetracyanoethylene and tetracyanoquinodimethane.

Positive hole-transporting compounds are electron-donating group-containing compounds, and examples of these compounds are described below.

High Molecular Weight Compound (1) Polyvinylcarbazole and derivatives thereof, described in JP-B-No. 34-10966.

(2) Vinyl polymers (e.g., polyvinyl pyrene, polyvinyl anthracene, poly-2-vinyl-4-(4'-dimethylaminophenyl)-5-phenyl-oxazole, poly-3-vinyl-N-ethylcarbazole), described in JP-B-No. 4318674 and JP-B-No. 43-19192.

(3) Polymers (e.g., polyacenaphthylene, polyindene, acenaphthylene/styrene copolymer), described in JP-B-No. 43-19193.

(4) Condensed resins (e.g., pyrene/formaldehyde resin, bromopyrene/formaldehyde resin, ethylcarbazole/formaldehyde resin), described in JP-B-No. 56-13940.

(5) Various triphenylmethane polymers, described in JP-A-No. 56-90883 and JP-A-No. 56-161550.

Low Molecular Weight Compounds (6) Triazole derivatives, described in U.S. Pat. No. 3,112,197.

(7) Oxadiazole derivatives, described in U.S. Pat. No. 3,189,447.

(8) Imidazole derivatives, described in JP-B-No. 37-16096.

(9) Polyarylalkane derivatives, described in U.S. Pat. Nos. 3,615,402, 3,820,989 and 3,542,544, JP-B-No.

45-555 and JP-B-No. 51-10983, JP-A-No. 51-93224, JP-A-No. 55-108667, JP-A-No. 55-156953 and JP-A-No. 566656.

(10) Pyrazoline derivatives and pyrazolone derivatives, described in U.S. Pat. Nos. 3,180,729 and 4,278,746, JP-A-No. 55-88064, JP-A-No. 55-88065, JP-A-No. A-49-105537, JP-A-No. 55-51086, JP-A-No. 56-80051, JP-A-No. 56-88141, JP-A-No. 57-45545, JP-A-No. 54-112637 and JP-A-No. 55-74546.

(11) Phenylenediamine derivatives, described in U.S. Pat. No. 3,615,404, JP-B-No. 51-10105, JP-A-No. 54-83435, JP-A-No. 54-110836 and JP-A-No. 54-119925, JP-B-No. 46-3712 and JP-B-No. 47-28336.

(12) Arylamine derivatives, described in U.S. Pat. No. 3,567,450, JP-B-No. 49-35702, West German Pat. No. (DAS) 1,110,518, U.S. Pat. Nos. 3,180,703, 3,240,597, 3,658,520, 4,232,103, 4,175,961 and 4,012,376, JP-A-No. 55-144250 and JP-A-No. 56-119132, JP-B-No. 39-27577, JP-A-No. 56-22437. described in U.S. Pat. No. 3,526,501.

(13) Amino-substituted chalcone derivates, described in U.S. Pat. No. 3,526,501.

(14) N,N-bicarbazyl derivatives, described in U.S. Pat. No. 3,542,546.

(15) Oxazole derivatives, described in U.S. Pat. No. 3,257,203.

(16) Styrylanthracene derivatives, described in JP-A-No. 56-46234.

(17) Fluorenone derivatives, described in JP-A-No. 54-110837.

(18) Hydrazone derivatives, described in U.S. Pat. No. 3,717,462, JP-A-No. 54-59143 (corresponding to U.S. Pat. No. 4,150,987), JP-A-No. 55-52063, JP-A-No. 55-52064, JP-A-No. 55-46760, JP-A-No. 55-85495, JP-A-No. 57-11350, JP-A-No. 57-148749 and JP-A-No. 57-104144.

(19) Benzidine derivatives, described in U.S. Pat. Nos. 4,047,948, 4,047,949, 4,265,990, 4,273,846, 4,299,897 and 4,306,008.

(20) Stilbene derivatives, described in JP-A-No. 58-190953, JP-A-No. 59-95540, JP-A-No. 59-97148, JP-A-No. 59-195658 and JP-A-No. 62-36674.

The charge carrier-transporting compounds for use in the present invention are not limited to only the above-described types of compounds (1) to (20) and any known charge carrier-transporting compounds may of course be used in the present invention.

Two or more kinds of the carrier-transporting compounds can be used together, if desired.

An adhesive layer or a barrier layer may optionally be provided between the electroconductive support and the photo-sensitive layer, if desired in the photoreceptor thus obtained in accordance with the present invention. Materials which can be used for formation of the adhesive or barrier layer include the above-described high molecular weight polymers which may be used as a binder, as well as gelatin, casein, polyvinyl alcohol, ethyl cellulose, carboxymethyl cellulose, the vinylidene chloride polymer latex described in JP-A-No. 59-84247, the styrene/butadiene polymer latex described in JP-A-No. 59-114544 and aluminum oxide. The thickness of the layer is preferably 1 μm or less.

Means of preventing an interference fringe which occurs when coherent rays such as laser rays are used for exposure, if desired, can be added to the photoreceptor thus prepared as mentioned above. Suitable means to achieve this, for example, are a means of providing a subbing layer having a light-diffusing and reflecting surface, described in JP-A-No. 60-186850; a means of providing a titanium black-containing subbing layer, described in JP-A-No. 60-184258; a method where almost all the light of the light source used is absorbed by the charge-generating layer, described in JP-A-No. 58-82249; a method where the charge-transporting layer has a micro-phase separating structure, described in JP-A-No. 61-18963; a method of introducing a substance of absorbing or scattering coherent rays into the photoconductive layer, described in JP-A-No. 60-86550; a method of providing depressions each having a depth of ¼ or more of the wavelength of the coherent rays on the surface of the photoreceptor, described in JP-A-No. 63-106757; and a method of providing a light-scattering layer or a light-absorbing layer on the back surface of the transparent support, described in JP-A-No. 62-174771.

As described in detail above, the electrophotographic photoreceptor of the present invention has high sensitivity and superior durability.

The electrophotographic photoreceptor of the present invention may be used broadly in various fields of electrophotographic copying machines as well as in printers using a laser beam or a Braun tube as a light source.

The tetrakisazo compound-containing photoconductive composition of the present invention can be used as a photoconductive layer in picture-taking tube in a video camera, or as a photoconductive layer in a solid state imaging device which has a light-receiving layer (photo-conductive layer) provided on entire surface of a known one-dimensionally or two-dimensionally arranged semiconductor circuits for transference or scanning of signals. In addition, the composition may also be used as a photoconductive layer for a solar battery, as described in A. K. Ghosh & Tom Feng, *J. Appl. Phys.*, 49 (12), 5982 (1978).

Further, the tetrakisazo compound of the present invention can also be used as photoconductive colored grains in photoelectrophoresis system or as colored grains in a dry or wet electrophotographic developer.

In accordance with the disclosures in JP-B-No. 37-17162 and JP-A-No. 55-19063, JP-A-No. 55-161250 and JP-A-No. 57-147656, the tetrakisazo compound of the present invention can be dispersed in an alkali-soluble resin liquid such as a phenol resin together with the above-described charge carrier-transporting compound, for example, oxadiazole derivatives or hydrazone derivatives, and the resulting dispersion may be coated and dried on an electroconductive support such as aluminum plate. The thus coated support is imagewise exposed, developed with a toner and etched with an aqueous alkaline solution to obtain a printing plate having high resolving power, high durability and high sensitivity. In the same manner, a printed circuit may also be prepared.

The following examples are given to illustrate the present invention in greater detail but these examples do not limit it in any way. Unless otherwise specifically indicated, all "parts" means "parts by weight".

EXAMPLE 1

5 parts of tetrakisazo Compound (I-1) produced in the above-mentioned production example was dispersed in a solution of 5 parts of polyester resin (trade name: Vylon 200, by TOYOBO CO., LTD.) dissolved in 50 parts of tetrahydrofuran, by ball milling for 20 hours. The resulting dispersion was coated on an electroconductive support (prepared by coating aluminum on the surface of a 75 μm polyethylene terephthalate film by vacuum evaporating plating, and having a surface electric resistance of $4 \times 10^2 \Omega$) with a wire rod and dried to form a 0.5 μm thick charge-generating layer.

Next, a solution of 3.6 parts of p-(diphenyl-amino) benzaldehyde-N'-methyl-N'phenylhydrazone as below:

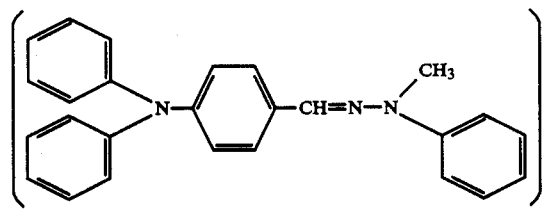

and 4 parts of polycarbonate of bisphenol A dissolved in 13.3 parts of dichloromethane and 26.6 parts of 1,2-dichloroethane was overcoated on the charge-generating layer with a wire rod and dried to form a 11 μm thick charge-transporting layer thereon. Thus, an electrophotographic photoreceptor having a two-layered photosensitive layer was prepared.

The photoreceptor thus produced was charged using a corona discharge of −6 KV, and the initial surface potential was represented by $V_O$. Then this was irradiated with a light from a tungsten lamp so that the illuminance on the surface of the photoreceptor was 30 luxes, and the exposure ($E_{50}$) necessary to attenuate the surface potential to one half of the initial surface potential $V_0$ was measured. Also, the surface potential (residual potential) $V_R$ after an exposure of 60 lux.sec was measured.

The same measurement was also conducted after 3000 repetitions. The results obtained are shown in Table 4 below.

TABLE 4

|  | 1st Time | 3000th Time |
|---|---|---|
| $V_o(V)$ | −620 | −610 |
| $E_{50}$ (lux · sec) | 2.0 | 2.2 |
| $V_R(V)$ | −5 | −6 |

EXAMPLES 2 TO 15

The process of Example 1 was repeated except that the tetrakisazo compounds as indicated in Table 5 below were used in place of the tetrakisazo Compound (I-1) of Example 1. Thus two-layered electrophotographic photoreceptors were prepared, and these were tested in the same manner as in Example 1. The half-value exposure $E_{50}$ to the initial potential $V_o$ was obtained for each sample. The results obtained are shown in Table 5 below.

TABLE 5

| Example No. | Tetrakisazo Compound Group No. | $A_1$ | $V_o$ [V] | $E_{50}$ [lux · sec] |
|---|---|---|---|---|
| 2 | (1) | $A_1$-22 | −700 | 2.3 |
| 3 | (1) | $A_1$-1 | −690 | 1.8 |
| 4 | (1) | $A_1$-5 | −650 | 5.4 |
| 5 | (1) | $A_1$-53 | −720 | 1.9 |
| 6 | (1) | $A_1$-157 | −800 | 2.0 |
| 7 | (1) | $A_1$-167 | −680 | 3.4 |
| 8 | (7) | $A_1$-21 | −670 | 2.6 |
| 9 | (21) | $A_1$-21 | −700 | 1.8 |
| 10 | (26) | $A_1$-21 | −710 | 1.9 |
| 11 | (29) | $A_1$-21 | −690 | 2.4 |
| 12 | (37) | $A_1$-21 | −700 | 2.2 |
| 13 | (41) | $A_1$-21 | −650 | 1.7 |
| 14 | (50) | $A_1$-21 | −770 | 2.0 |
| 15 | (50) | $A_1$-22 | −700 | 2.2 |

EXAMPLE 16

5 parts of tetrakisazo Compound (I-1), 40 parts of the same hydrazone compound as used in Example 1 and 100 parts of benzyl methacrylate/methacrylic acid copolymer ($[\eta]=0.12$ at 30° C. in methyl ethyl ketone, methacrylic acid content: 32.9%) were added to 660 parts of dichloromethane and ultrasonically dispersed.

The resulting dispersion was coated on a sand-processed 0.25 mm-thick aluminum plate and dried to prepare an electrophotographic photo-sensitive printing plate material having an electrophotographic photosensitive layer with a dry thickness of 6 mm.

The same was charged using a corona discharge (+6 KV) in the dark so that the surface potential of the photo-sensitive layer was charged to about +600 V. Next, the surface of the sample was irradiated with a tungsten light (color temperature: 2854° K) to an illuminance of 2.0 lux, whereupon the half-value exposure was 5.8 lux.sec.

Next, the sample was charged to a surface potential of about +400 V in the dark and then contact exposed through a positive image transmission original. The thus exposed sample was immersed a liquid developer containing a toner prepared by adding 5 parts of a fine polymethyl methacrylate grain (toner) dispersion and 0.01 part of soybean lecithin to 1000 parts of Isoper H (petroleum solvent, manufactured by Esso Standard Co.), to obtain a sharp positive toner image.

Then this was heated at 100° C. for 30 seconds so as to fix the toner image. The thus prepared printing plate material was immersed in a solution of 70 parts of sodium metasilicate hydrate dissolved in 140 parts of glycerin, 550 parts of ethylene glycol and 150 parts of ethanol for 1 minute and then washed by gently brushing the surface with flowing water, whereby the photosensitive layer to which the toner had not been fixed was removed. Thus a printing plate was obtained.

In place of the liquid developer, the electrostatic latent image was developed using magnetic brush-development with Xerox 3500 Toner (manufactured by Fuji Xerox Co., Ltd.) and then heated at 80° C. for 30 seconds for fixation. Then the photo-sensitive layer with no toner was removed using an alkaline solution to obtain a printing plate.

The thus prepared printing plate was set in a Hamada Star 600 CD offset printing machine and printing was conducted in a conventional manner. 50,000 prints which were all extremely sharp with no background stain were obtained.

While the invention has been described in detail and with reference to specific embodiments thereof, it will be apparent to one skilled in the art that various changes and modifications can be made therein without departing from the spirit and scope thereof.

What is claimed is:

1. An electrophotograpahic photoreceptor comprising an electroconductive support having thereon a layer containing a charge carrier-transporting compound and a charge carrier-generating compound or having thereon a layer containing a charge carrier-transporting compound and a layer containing a charge carrier-generating compound, wherein the photoreceptor contains a tetrakisazo compound of the following formula (I) as the charge carrier-generating compound:

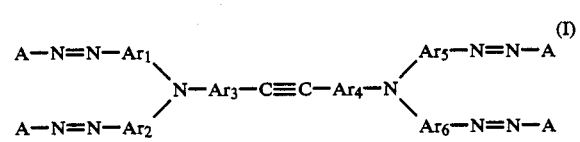

wherein $Ar_1$, $Ar_2$, $Ar_3$, $Ar_4$, $Ar_5$ and $Ar_6$, which may be the same or different, each represents an arylene group, a divalent condensed polycyclic aromatic group or a divalent heterocyclic aromatic group;

A represents

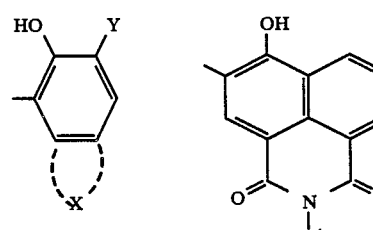

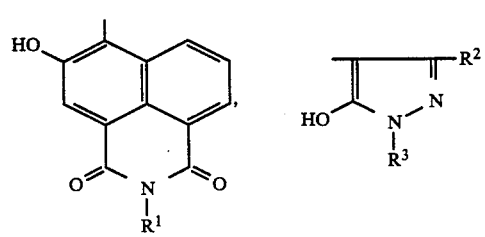

-continued

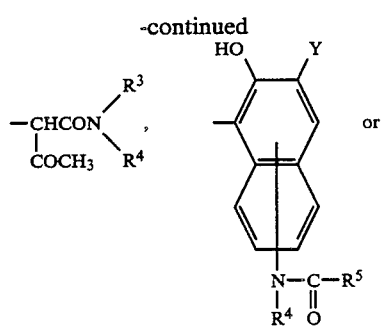

X represents an atomic group necessary to form an aromatic ring or heterocyclic ring condensed with the benzene ring of the formula having the hydroxyl group and Y bonded thereto;

Y represents

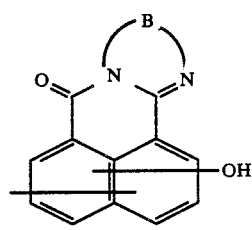

$R^1$ represents an alkyl group or a phenyl group;

$R^2$ represents a hydrogen atom, a lower alkyl group, a carbamoyl group, a carboxyl group, an alkoxycarbonyl group, an aryloxycarbonyl group or an amino group;

$R^3$ represents an alkyl group, an aromatic group or a heterocyclic aromatic group;

$R^4$ and $R^5$, which may be the same or different, each represents a hydrogen atom, an alkyl group, an aromatic group or a heterocyclic aromatic group, provided that both $R^4$ and $R^5$ are not simultaneously hydrogen atoms;

when Y represents

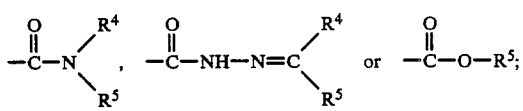

$R^5$ is not a hydrogen atom; and

B represents a divalent aromatic hydrocarbon residue or a divalent heterocyclic group containing a nitrogen atom (s) in the ring.

2. The electrophotographic photoreceptor as in claim 1, wherein said photoreceptor includes a photosensitive layer having one or more tetrakisazo compounds of the formula (I) dispersed in a charge carrier-transporting medium on said electroconductive support.

3. The electrophotographic photoreceptor as in claim 1, wherein said photoreceptor includes a charge carrier-generating layer containing one or more tetrakisazo compounds of the formula (I) on said electroconductive support and a charge carrier-transporting medium layer superposed over said charge carrier-generating layer.

4. The electrophotographic photoreceptor as in claim 1, wherein said photoreceptor includes a charge carrier-generating medium layer on said electroconductive support and a charge carrier-generating layer containing one or more tetrakisazo compounds of the formula (I) superposed over said charge carrier-transporting medium layer.

5. The electrophotographic photoreceptor as in claim 2, wherein said photosensitive layer additionally includes a binder in which said compounds are dipersed.

6. The electrophotographic photoreceptor as in claim 3, wherein said charge carrier-generating layer additionally contains a binder in which compounds are dispersed.

7. the electrophotographic photoreceptor as in claim 4, wherein said charge carrier-generrting layer additionally contains a binder in which said compounds are dispersed.

8. The electrophotographic photoreceptor as in claim 2, wherein the amount of said tetrakisazo compound is from 0.01 to 0.5 times by weight of the charge carrier-transporting compound in which said compounds are dispersed.

9. The electrophotographic photoreceptor as in claim 5, wherein the amount of the tetrakisazo compound is 0.01 to 2 times by weight of the binder and the amount of the charge carrier-transporting compound is from 0.1 to 2 times by weight of the binder.

10. The electrophotographic photoreceptor as in claim 6, wherein the amount of the tetrakisazo compound is from 0.1 to 10 times by weight of the binder.

11. The electrophotographic photoreceptor as in claim 7, wherein the amount of the tetrakisazo compound is from 0.1 to 10 times by weight of the binder.

12. The electrophotographic photoreceptor as in claim 8, wherein said tetrakisazo compounds of the formula (I) are dispersed in a charge carrier-transporting medium, and wherein the charge carrier-transporting compound is a high molecular weight compound acting as a binder, and said layer contains no binder other than said charge carrier-transporting compound.

* * * * *